(12) United States Patent
Chadaga

(10) Patent No.: US 10,348,819 B2
(45) Date of Patent: Jul. 9, 2019

(54) STUDENT GROUPING AND COMMUNICATION SYSTEM

(71) Applicant: Dell Products L.P., Round Rock, TX (US)

(72) Inventor: Vikram Vadiraja Chadaga, San Jose, CA (US)

(73) Assignee: Dell Products L.P., Round Rock, TX (US)

( * ) Notice: Subject to any disclaimer, the term of this patent is extended or adjusted under 35 U.S.C. 154(b) by 224 days.

(21) Appl. No.: 14/957,337

(22) Filed: Dec. 2, 2015

(65) Prior Publication Data

US 2017/0163725 A1  Jun. 8, 2017

(51) Int. Cl.
*G06F 13/00* (2006.01)
*H04L 29/08* (2006.01)
*G06F 3/0482* (2013.01)
*G06T 11/00* (2006.01)
(Continued)

(52) U.S. Cl.
CPC ........ *H04L 67/1044* (2013.01); *G06F 1/1637* (2013.01); *G06F 3/0481* (2013.01); *G06F 3/0482* (2013.01); *G06T 11/001* (2013.01)

(58) Field of Classification Search
CPC ........... H04L 41/0213; H04L 29/08072; H04L 29/06; H04L 41/22; H04L 41/12; H04L 12/2602; H04L 43/00; H04L 67/1044; G08B 3/10; G08B 25/14; G08B 13/1672; G08B 21/12; G08B 25/10; G08B 7/06; G08B 7/062; G08B 7/066; G08B 17/00; G08B 17/06; G08B 17/10; G08B 21/00; G08B 21/22; G08B 21/0288; G08B 21/0446; G08B 23/00; B60R 25/04; B60R 25/102; B60R 25/33; G07C 5/008; G07C 9/00182; A01M 1/026; A61B 5/0002; F16M 11/10; G02F 1/133308; G06F 1/16; G06F 1/165; G06F 1/1601; G06F 1/1616; G06F 1/1637; G06F 3/048; G06F 3/0481; G06F 3/0482; G06F 3/04817; G06F 3/04847; G06F 9/4443; G06F 11/3664; G06F 13/00; G06F 13/409; G06F 13/4081; G06F 19/3418; G06T 11/001

USPC .............. 340/540, 5.1, 517, 573.1; 709/223; 361/679.21

See application file for complete search history.

(56) References Cited

U.S. PATENT DOCUMENTS 8,624,731 B2 * 1/2014 Dearborn ................ G06F 1/165
340/5.1
2011/0260864 A1 * 10/2011 Dearborn .............. G06F 1/1616
340/540

* cited by examiner

*Primary Examiner* — Robert B Harrell
(74) *Attorney, Agent, or Firm* — Haynes and Boone, LLP

(57) ABSTRACT

A student grouping and communication system includes student devices coupled through a network to a teacher device and each including an indicator device that can provide a indication. The teacher device displays a graphical user interface that includes a student device indicator for each student device. The teacher device then receives a request to group the student devices and determines groups of student devices. Each of the groups of student device includes a subset of the student devices that are not included in the others of the groups of student devices. The teacher device then provides a group designation instruction to each of the student devices to cause each respective group of student devices to activate their indicator devices to provide a first group indicator that is different than other group indicators provided by the indicator devices on student devices in the others of the groups of student devices.

20 Claims, 20 Drawing Sheets

(51) Int. Cl.
*G06F 1/16* (2006.01)
*G06F 3/0481* (2013.01)

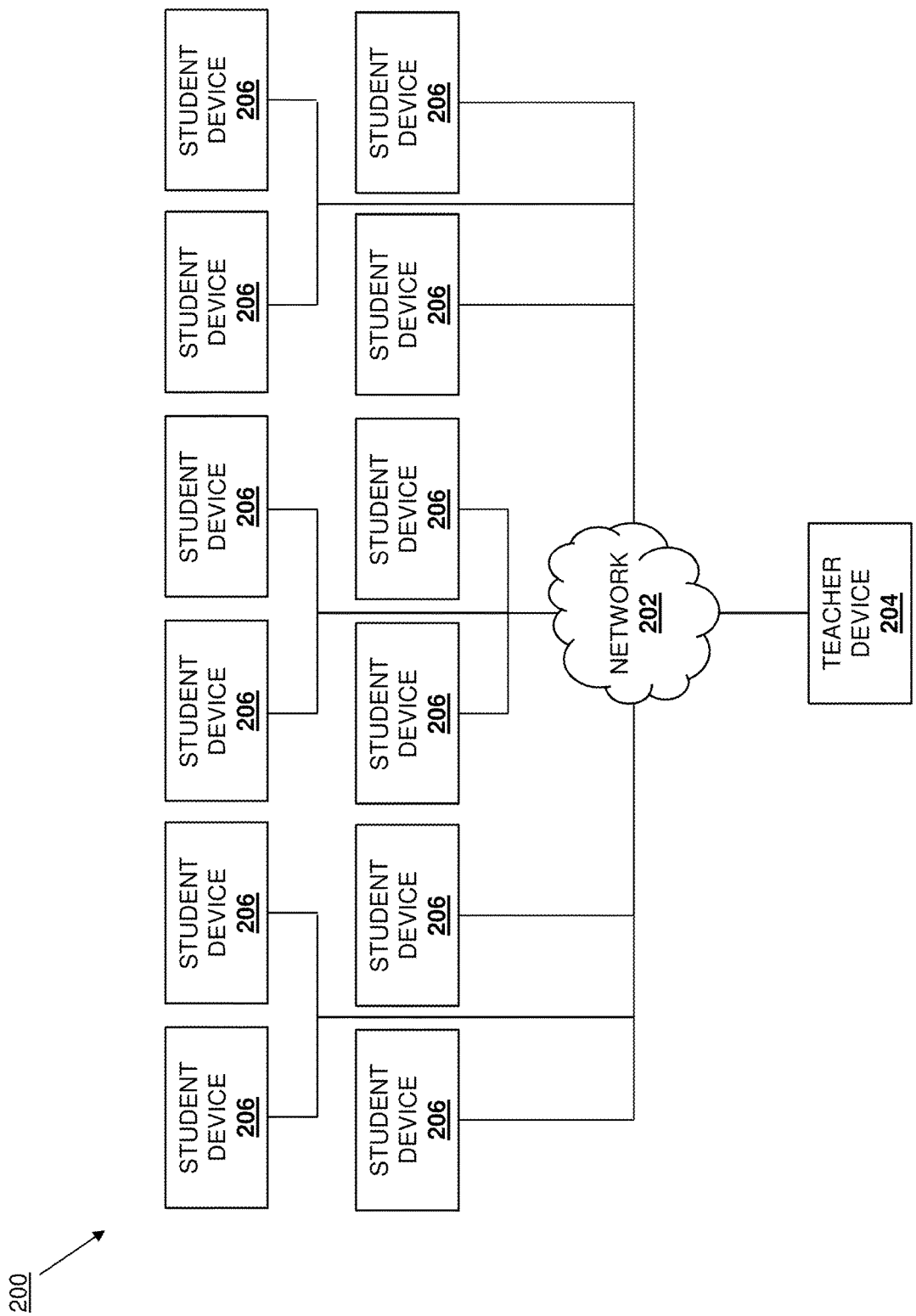

STUDENT GROUPING AND COMMUNICATION SYSTEM

BACKGROUND

The present disclosure relates generally to information handling systems, and more particularly to a network of information handling systems for grouping of and communicating with students.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, laptop/notebook computing devices, tablet computing devices, and desktop computing devices are increasingly used in classrooms to enabled students to learn more efficiently. However, many aspects of the classroom are still relatively inefficient. For example, in many situations a teacher may want to divide students into groups in order to provide any of a variety of group learning environments. The determination of such groups take time and effort, particularly when it is desired that particular students be grouped together based on particular student characteristics.

Accordingly, it would be desirable to provide for student grouping and communication using a network of information handling systems.

SUMMARY

According to one embodiment, an information handling system (IHS) includes a display system; a communication system that is configured to couple to a plurality of student devices through a network; a processing system that is coupled to the communication system and the display device; and a memory system that is coupled to the processing system and that includes instructions that, when executed by the processing system, cause the processing system to provide a student device control/communication engine that is configured to: provide a graphical user interface for display on the display system that includes a student device indicator for each of the plurality of student devices; receive a request through the graphical user interface to group the plurality of students devices; determine a plurality of groups of student devices, wherein each of the plurality of groups of student device includes a subset of the plurality of student devices that are not included in the others of the plurality of groups of student devices; and provide a group designation instruction via the communication system through the network to each of the plurality of student devices, wherein the group designation instructions are configured to cause each respective group of student devices to activate indicator devices on those student devices to provide a first type group indicator that is different than a plurality of other types of group indicators that are provided by the indicator devices on student devices in the others of the groups of student.

BRIEF DESCRIPTION OF THE DRAWINGS

FIG. 2 is a schematic view illustrating an embodiment of a student grouping and communication system.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
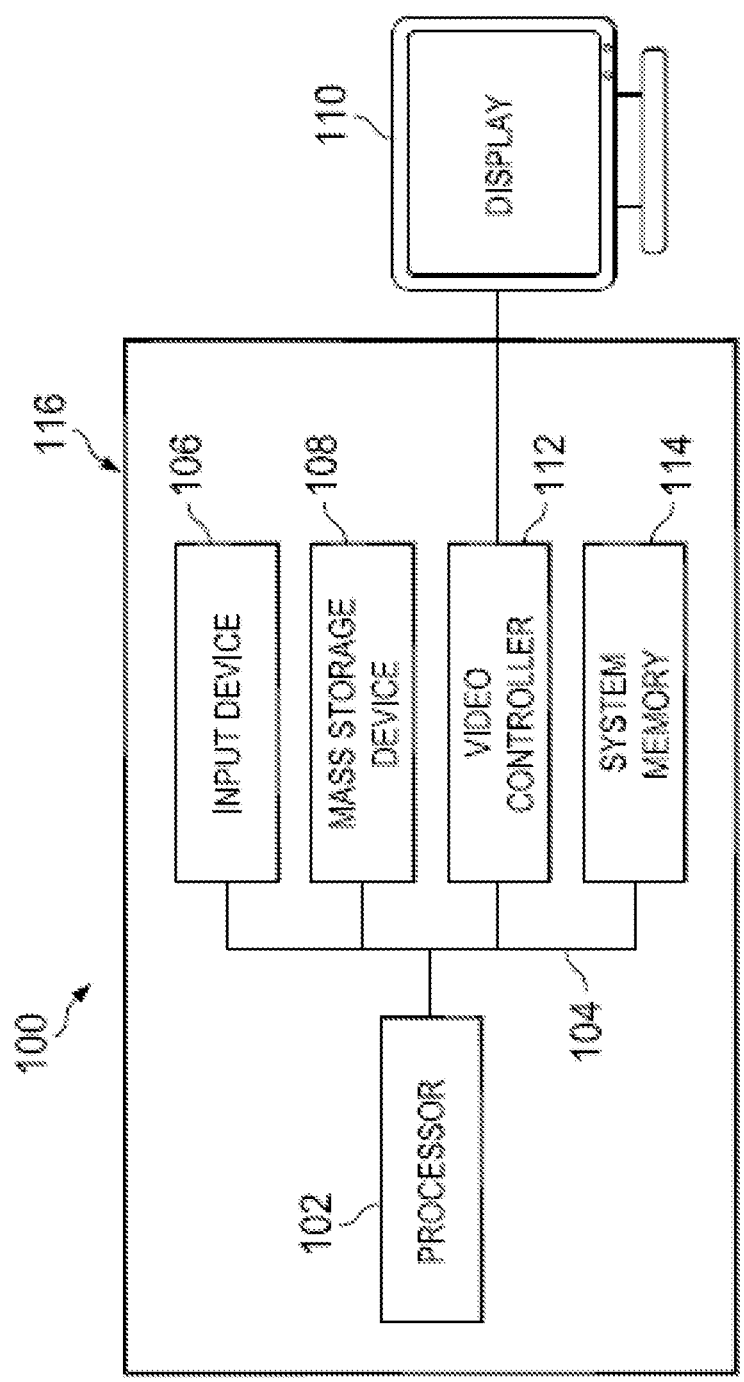
FIG. 1 is a schematic view illustrating an embodiment of an information handling system.

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Referring now to FIG. 2, an embodiment of a student grouping and communication system 200 is illustrated. The student grouping and communication system includes a network 202 that may include a wireless network, a wired networked, and combinations thereof, and may be provided using a Local Area Network (LAN), a Wide Area Network (WAN), a short range communication network (e.g., such as a BLUETOOTH® network), and/or other networks known in the art. A teacher device 204 is coupled to the network 202, and may be provided by the IHS 100 discussed above with reference to FIG. 1 and/or include some or all of the components of the IHS 100. In the embodiments discussed below, the teacher device 204 is described as a laptop/notebook computing device, but in other embodiments, the teacher device 204 may be a desktop computing device, a tablet computing device, a mobile phone, and/or other computing devices known in the art. A plurality of student devices 206 are coupled to the network 202, and may be provided by the IHS 100 discussed above with reference to FIG. 1 and/or include some or all of the components of the IHS 100. In the embodiments discussed below, the student devices 206 is described as laptop/notebook computing devices, but in other embodiments, any or all of the student devices 206 may by any of a desktop computing device, a tablet computing device, a mobile phone, and/or other computing devices known in the art. While the embodiment of the grouping and communication system taught by the present disclosure is illustrated and described as involving a teacher device and student devices, other devices used by other entities will benefit from teachings the present disclosure and thus are envisioned as falling within its scope. In other words, the grouping and communication system taught herein is not envisioned as being limited to the classroom situations involving students and teachers, and one of skill in the art in possession of the present disclosure will understand that that grouping and communication system may be extended to any situation where the grouping of people associated with devices is desirable.

Figure 3A:
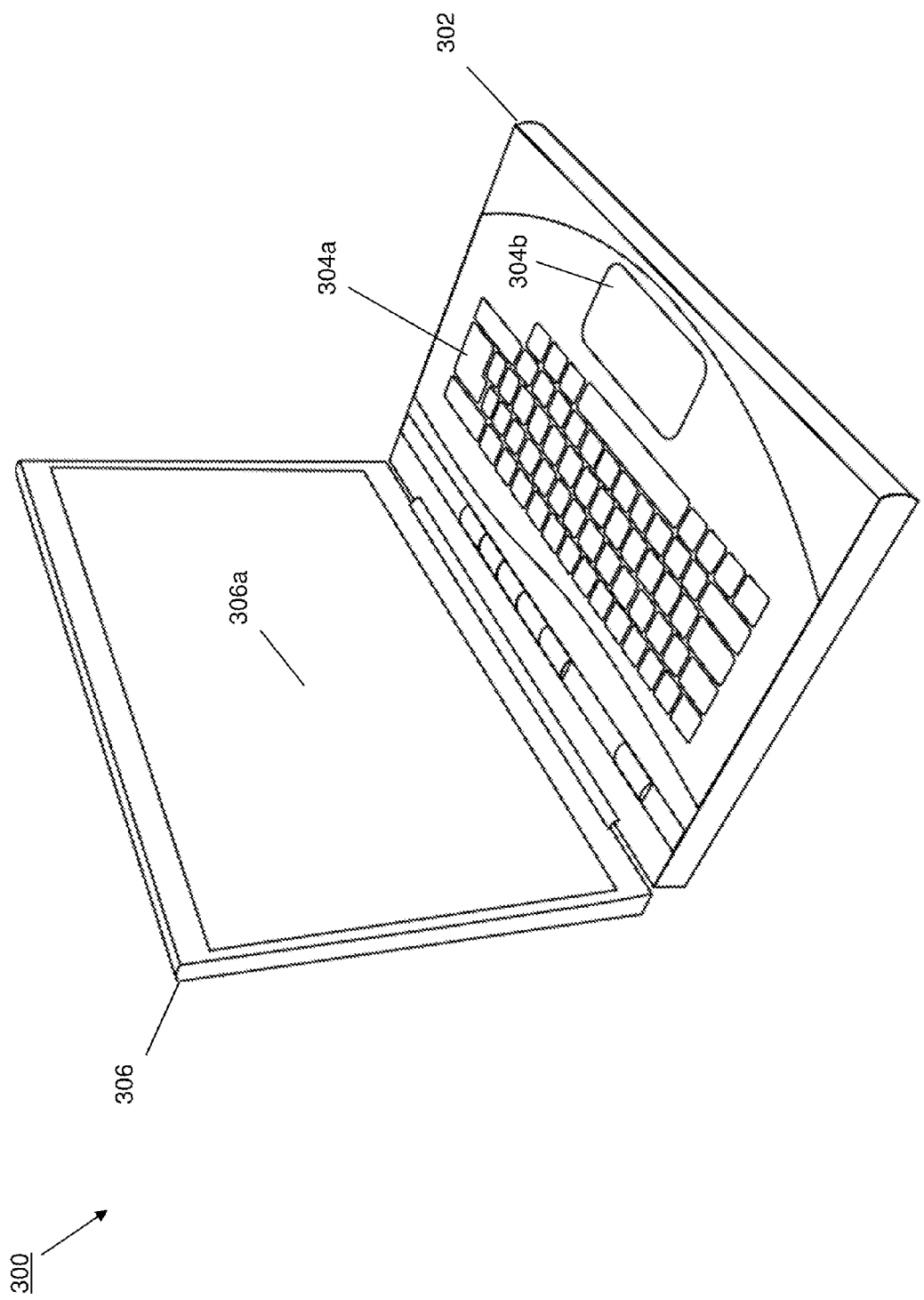
FIG. 3A is a perspective view illustrating an embodiment of a computing device that may be used in the student grouping and communication system of FIG. 2.
Figure 3B:
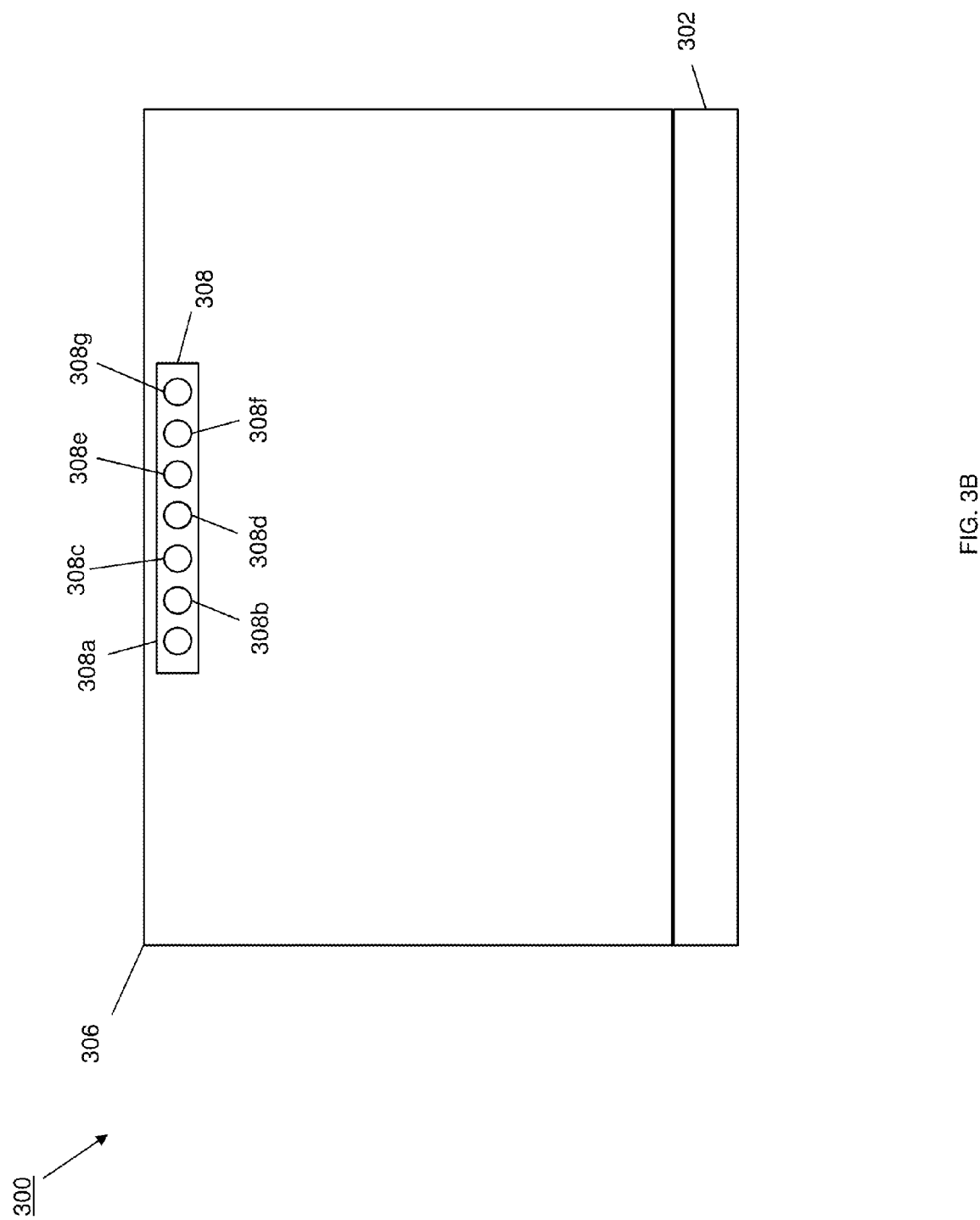
FIG. 3B is a rear view illustrating an embodiment of the computing device of FIG. 3B.

Referring now to FIGS. 3A and 3B, an embodiment of a computing device 300 is illustrated. In an embodiment, the computing device 300 may be the IHS 100 discussed above with reference to FIG. 1, and/or may include some or all of the components of the IHS 100. In the embodiment discussed below, the computing device 300 may be utilized to provide the teacher device 204 discussed above with reference to FIG. 2, and/or any or all of the student devices 206 discussed above with reference to FIG. 2. The computing device 300 includes a base 302 that houses components of the computing device 300, including the input device 304a (a keyboard in the illustrated embodiments) and input device 304b (a touchpad in the illustrated embodiment). A display system 306 is moveably coupled to the base 302 and includes a display screen 306a that is located on a first side of the display system 306 such that it substantially faces a first direction (i.e., while the display screen 306a is a flat display screen in the illustrated embodiment, curved or other non-flat screens may be utilized that "substantially face" the first direction by being located on a side of the display system 306 such that they are viewable by a user located on that side of the display system 306). As can be seen in FIG. 3B, an indicator device 308 is located on a second side of the display system 306 such that it substantially faces a second direction that is opposite the first direction (i.e., the indicator device 308 is located on the "back" of the display system 306).

In the illustrated embodiment, the indicator device 308 includes a Light Emitting Diode (LED) indicator device that includes a plurality of LEDs 308a, 308b, 308c, 308d, 308e, 308f, and 308g that, as discussed below, are each configured to emit a different color of light. However, other indicators devices such as, for example, an LED indicator device with fewer LEDs (e.g., a single LED that is configured to emit different colors of light, fewer LEDs than illustrated that are configured to emit one or more colors of light, etc.), a display screen that is configured to provide the indications discussed below, an audio system that is configured to provide distinct indications (e.g., by emitting different sounds), and/or any other device that may provide indications that may be used to distinguish the groups discussed below or provide for the communications discussed below are envisioned as falling within the scope of the present disclosure. In the embodiments discussed below, the computing device 300 is provided as the student devices, and the teacher device is discussed as being substantially similar to the computing device 300 but without utilization of the indicator device 308. However, the teacher devices discussed below may be provided by the computing device 300 such that they include the indicator device 308 while remaining within the scope of the present disclosure, and utilization of the indicator device 308 by a teacher device to provide indications to students will fall within the scope of the present disclosure as well. While one of skill in the art in possession of the present disclosure will recognize that the computing device 300 is described as a laptop/notebook computing device, other computing devices including tablet computing devices, desktop computing devices, mobile phones, and/or other computing devices known in the art may be provided with the indicator device 308 and utilized as discussed below while remaining within the scope of the present disclosure.

Figure 4:
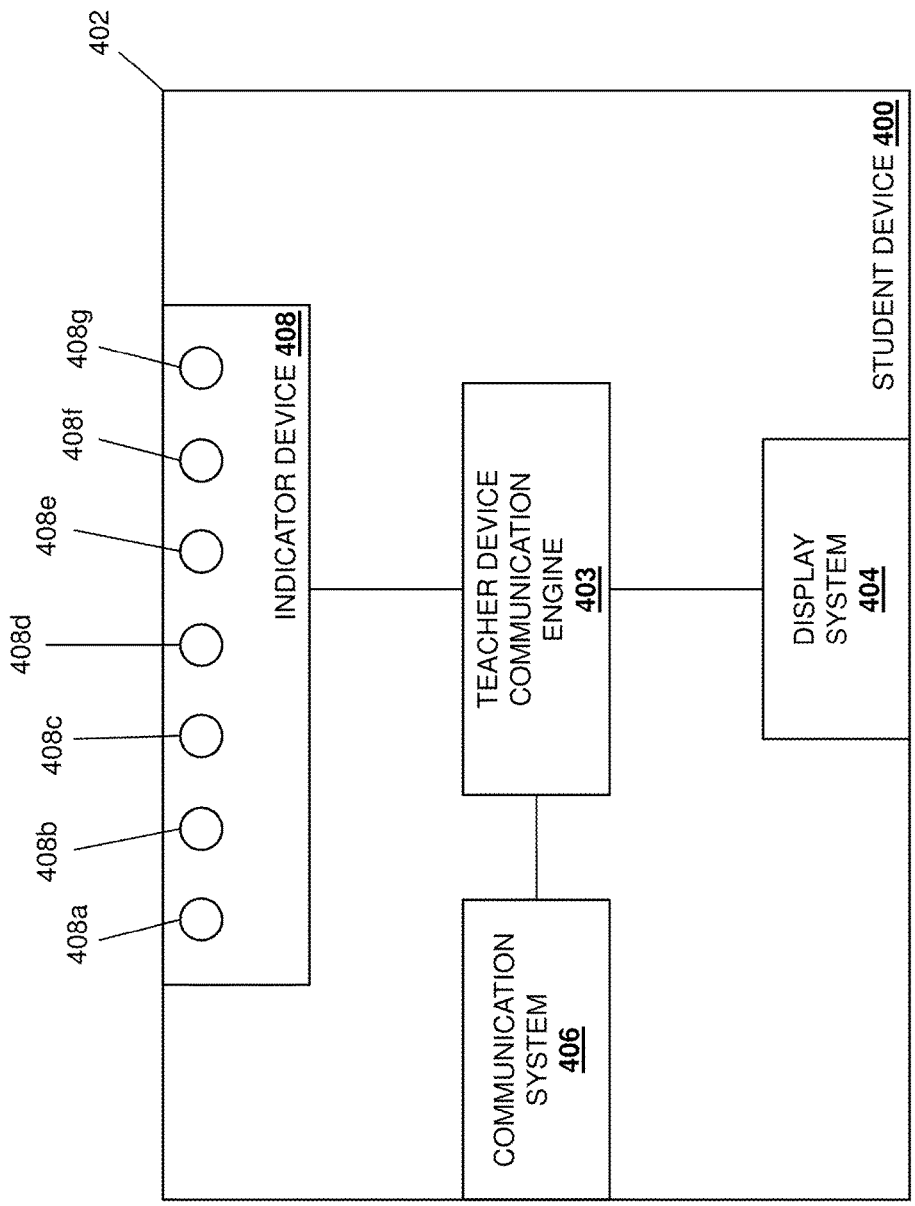
FIG. 4 is a schematic view illustrating an embodiment of a student device used in the student grouping and communication system of FIG. 2.

Referring now to FIG. 4, an embodiment of a student device 400 is illustrated. The student device 400 may be the any or all of the student devices 206 discussed above with reference to FIG. 2, and may be provided by the computing device 300 discussed above with reference to FIG. 3. As such, the student device 400 may be the IHS 100 discussed above with reference to FIG. 1 and/or may include some or all of the components of the IHS 100. In the illustrated embodiment, the student device 400 includes a chassis 402 that houses the components of the student device 400, only some of which are illustrated in FIG. 4 for clarity. For example, the chassis 402 may house a processing system (not illustrated, but which may include the processor 102 discussed above with reference to FIG. 1) and a memory system (not illustrated, but which may include the memory system 114 discussed above with reference to FIG. 1) that includes instructions that, when executed by the processing system, cause the processing system to provide a teacher device communication engine 402 that is configured to perform the functions of the teacher device communication engines and student devices discussed below.

The chassis 402 also provides and/or houses a display system 404 that may be the display system 306 discussed above with reference to FIG. 3. The display system 404 is coupled to the teacher device communication engine 403 (e.g., via a coupling between the processing system and the display system 404) and configured to receive and display information provided by the teacher device communication engine 403 as discussed below. The chassis 402 also houses a communication system 406 that is coupled to the teacher device communication engine 403 (e.g., via a coupling between the processing system and the communication system 406) and configured to couple to a network (e.g., the network 202 discussed above with reference to FIG. 2) to transmit information between the teacher device communication engine 403 and the teacher device 202 as discussed below. The chassis 402 also houses and/or provides an indicator device 408 that may be the indicator device 308 discussed above with reference to FIG. 3B. The indicator device 408 is coupled to the teacher device communication engine 403 (e.g., via a coupling between the processing system and the indicator device 408) and configured to receive instructions from the teacher device communication engine 403 that are configured to cause the indicator device 408 to provide indications. In the illustrated embodiment, the indicator device 408 includes a Light Emitting Diode (LED) indicator device that includes a plurality of LEDs 408a, 408b, 408c, 408d, 408e, 408f, and 408g that, as discussed below, are each configured to emit a different color of light. However, other indicators devices such as, for example, an LED indicator device with fewer LEDs (e.g., a single LED that is configured to emit different colors of light, fewer LEDs than illustrated that are configured to emit one or more colors of light, etc.), a display screen that is configured to provide the indications discussed below, an audio system that is configured to provide the different indications (e.g., by emitting different sounds), and/or any other device that may provide indications that may be used to distinguish the groups discussed below or provide for the communications discussed below are envisioned as falling within the scope of the present disclosure. While a specific student device 400 is illustrated and described, one of skill in the art in possession of the present disclosure will recognize that the student device may include a variety of different components and configurations while falling within the scope of the present disclosure.

Figure 5:
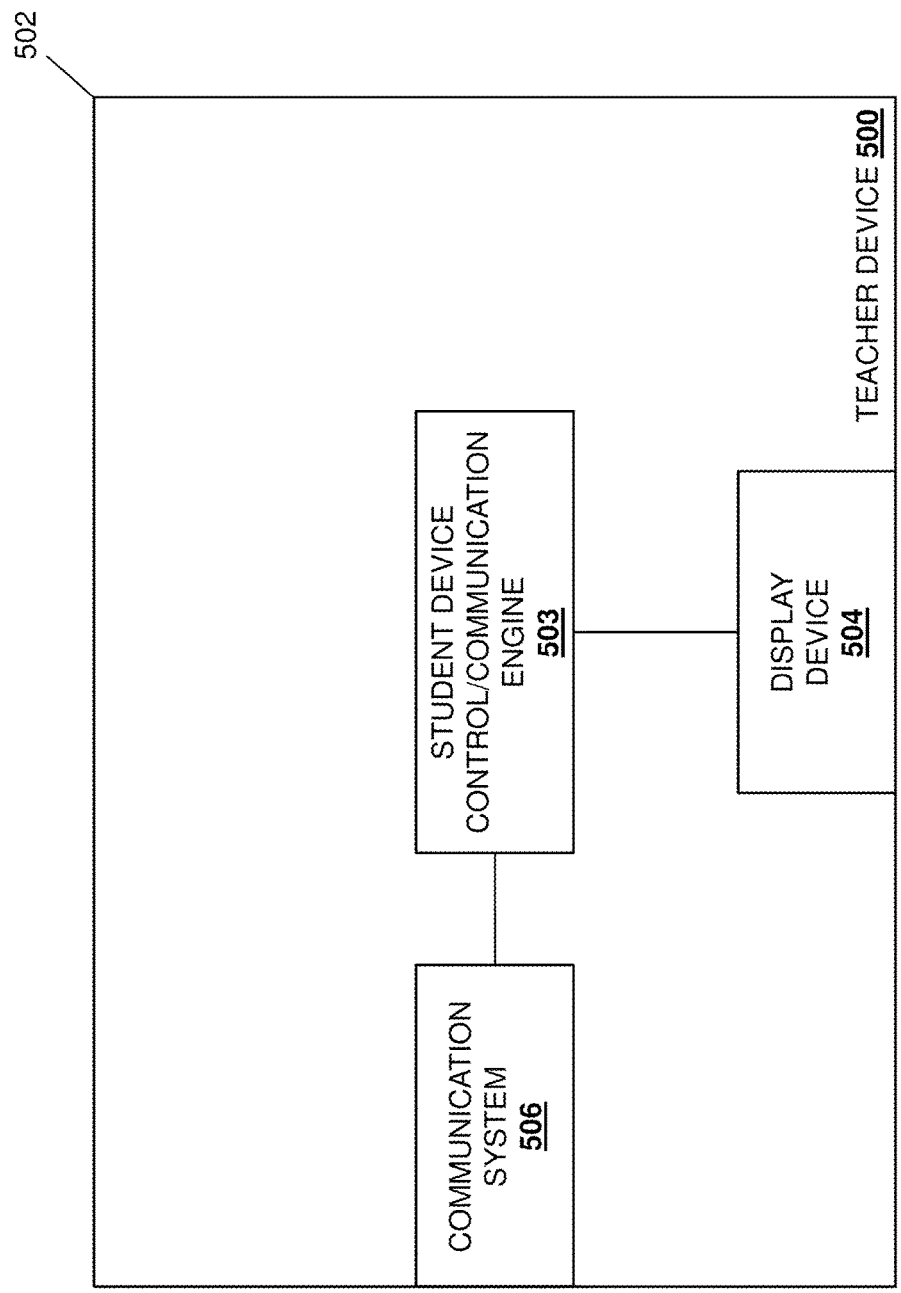
FIG. 5 is a schematic view illustrating an embodiment of a teacher device used in the student grouping and communication system of FIG. 2.

Referring now to FIG. 5, an embodiment of a teacher device 500 is illustrated. The teacher device 500 may be the teacher devices 204 discussed above with reference to FIG. 2, and may be provided by the computing device 300 discussed above with reference to FIG. 3. As such, the teacher device 500 may be the IHS 100 discussed above with reference to FIG. 1 and/or may include some or all of the components of the IHS 100. In the illustrated embodiment, the teacher device 500 includes a chassis 502 that houses the components of the teacher device 500, only some of which are illustrated in FIG. 5 for clarity. For example, the chassis 502 may house a processing system (not illustrated, but which may include the processor 102 discussed above with reference to FIG. 1) and a memory system (not illustrated, but which may include the memory system 114 discussed above with reference to FIG. 1) that includes instructions that, when executed by the processing system, cause the processing system to provide a student device control/communication engine 503 that is configured to perform the functions of the student device control/communication engines and teacher devices discussed below.

The chassis 502 also provides and/or houses a display system 504 that may be the display system 306 discussed above with reference to FIG. 3. The display system 504 is coupled to the student device control/communication engine 503 (e.g., via a coupling between the processing system and the display system 504) and configured to receive and display information provided by the student device control/communication engine 503 as discussed below. The chassis 502 also houses a communication system 506 that is coupled to the student device control/communication engine 503 (e.g., via a coupling between the processing system and the communication system 506) and configured to couple to a network (e.g., the network 202 discussed above with reference to FIG. 2) to transmit information between the student device control/communication engine 503 and the student devices 206 as discussed below. While not illustrated as housing and/or providing an indicator device (e.g., the indicator devices 304 and 408 discussed above with reference to FIGS. 3B and 4), the teacher device 500 may include such an indicator device that may be used in at least some of the embodiments as described below. While a specific teacher device 500 is illustrated and described, one of skill in the art in possession of the present disclosure will recognize that the teacher device may include a variety of different components and configurations while falling within the scope of the present disclosure.

Figure 6:
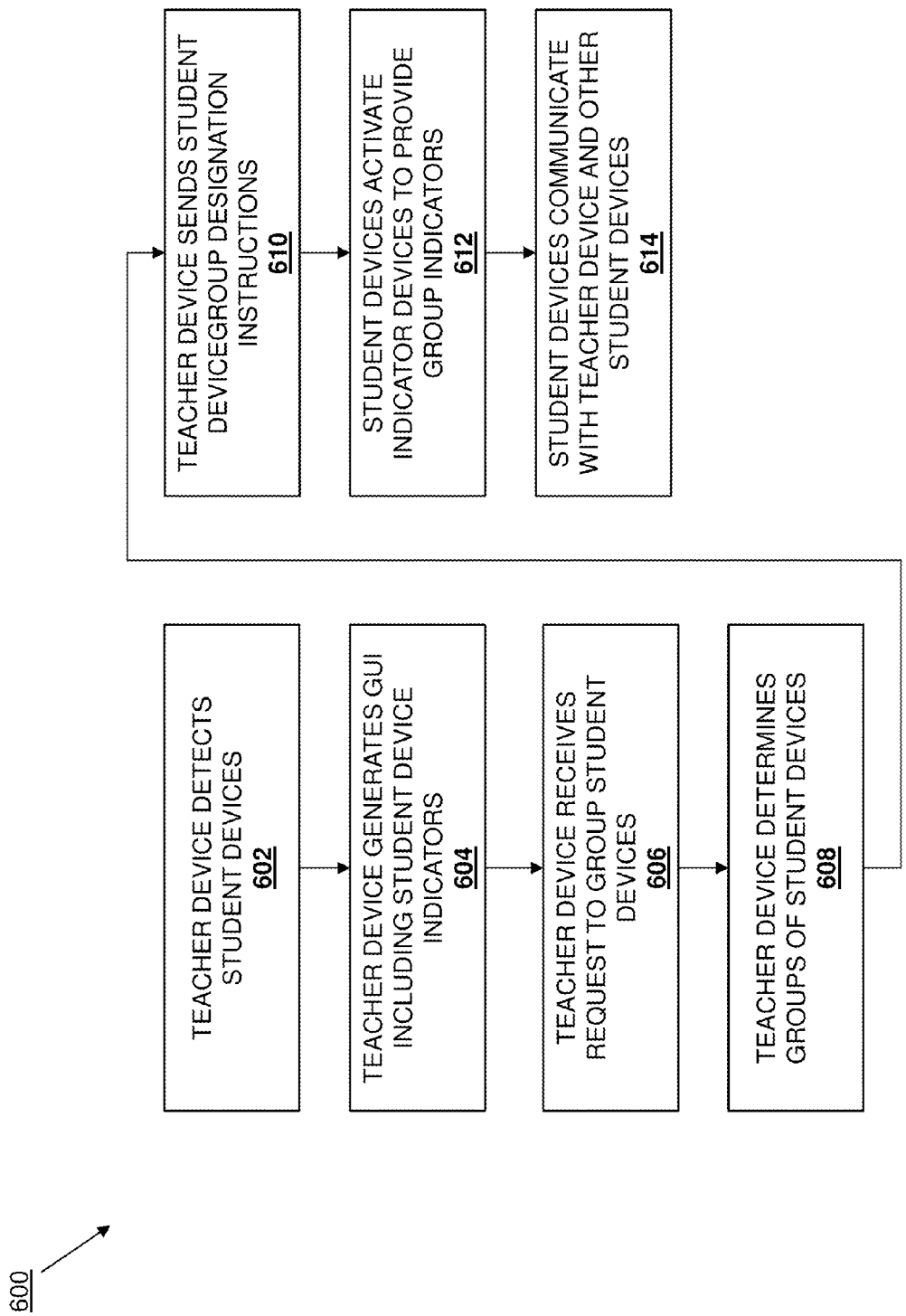
FIG. 6 is a flow chart illustrating an embodiment of a method for grouping of and communicating with students.

Referring now to FIG. 6, an embodiment of a method 600 for grouping student devices is illustrated. As discussed below, the systems and methods of the present disclosure provide a teacher device that detects student devices, and generates and displays a graphical user interface that allows a user of the teacher device to visualize the student devices, group the student devices into different groups either automatically or via a manual grouping process enabled by the graphical user interface, and send group designation instructions to each of the student devices that cause those student devices to active their respective indicator devices in order to provide an group indication that indicates which group they belong to (e.g., via respective color indications provided by an LED on each student device). The group indications allow students to be grouped and recognize their groups quickly and easily, and the grouping of the student devices enables private communications that may be directed to selected ones of the groups of the students devices. As such, students may be quickly and easily grouped according to any of a plurality of desired factors, and then communicated with by group in any of a variety of desired manners. In addition, other communication functionality may be realized using the teaching device and students devices as discussed below.

The method 600 begins at block 602 where a teacher device detects student devices. In an embodiment, the student device control/communication engine 503 in the teacher device 500 may detect student devices in a variety of manners. For example, with reference to FIG. 2, the teacher device 204 may communicate with the student devices 206 over the network 202 to detect those student devices 206. In some embodiments, the detection at block 602 may include communication over a relatively short range network 202 (e.g., a BLUETOOTH® network) such that any student device 206 within range of communicating with the teacher device 204 will be detected at block 602. Such embodiments may assume that student devices 206 within communication range of the teacher device 204 are in the same classroom as the teacher device 204. As such, the teacher device communication device 403 may send student device identification data through the communication system 406 in the student device 400 and over the network 202, and the student device control/communication engine 503 in the teacher device 500 may receive that student device identification data through the communication system 506 and use that student device identification data to detect the student device.

Figure 7:
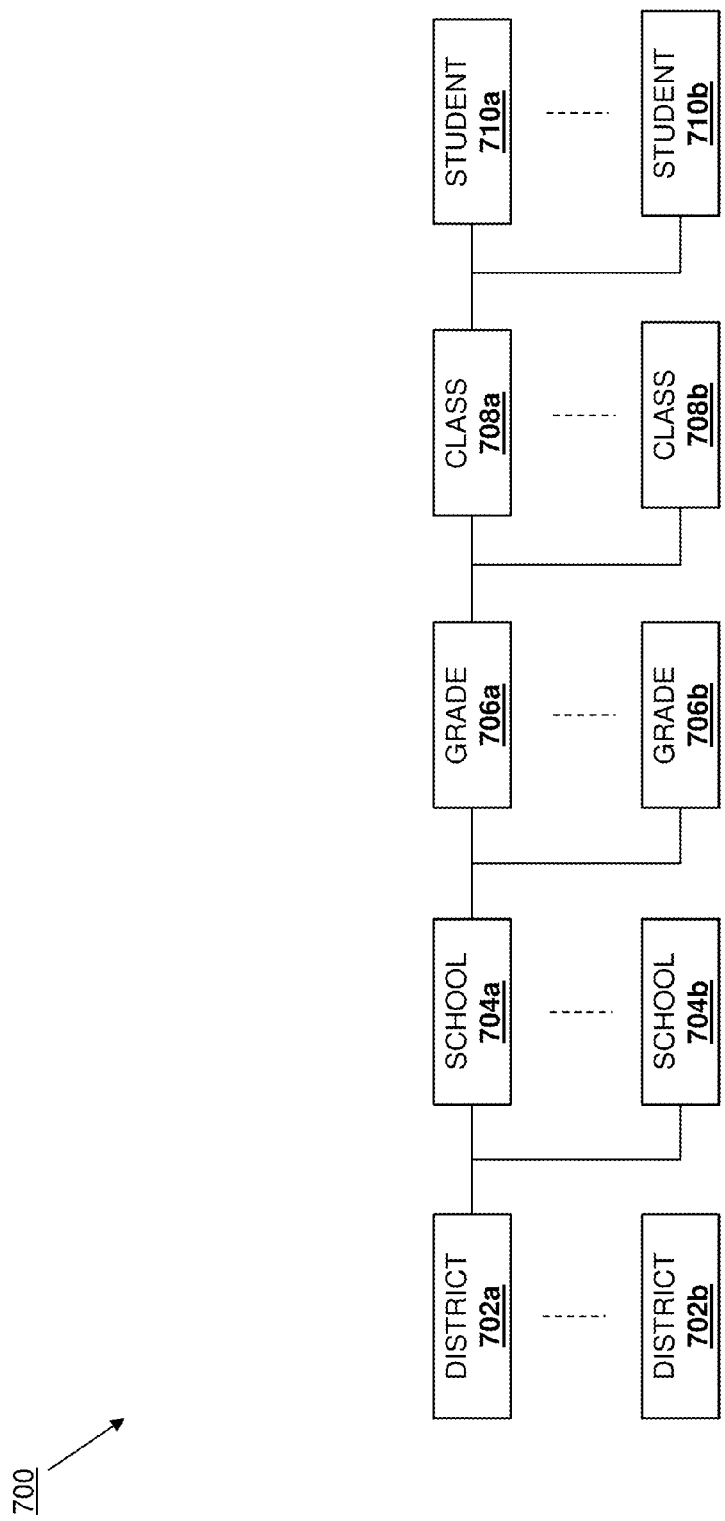
FIG. 7 is a schematic view illustrating an embodiment of a student data structure.

Referring now to FIG. 7, an embodiment of a student data structure 700 is illustrated that may be used by the teacher device 500 at block 602 to detect the student devices. For example, the student data structure 700 may be stored in the teacher device 500, accessible by the teacher device 500 through a network (e.g., at a server or other central computing device via a web link or universal resource locator), and or available to the teacher device 500 at block 602. The student data structure 700 provides a hierarchy of school entities that allow a user of the teacher device 500 to access information about a plurality of students that may be detected at block 602. In the illustrated embodiment, the student data structure 700 identifies a plurality of districts 702*a* and up to 702*b*, each representing a school district that includes a plurality of schools. For example, as illustrated in FIG. 7, the district 702*a* is associated with a plurality of schools 704*a* and up to 704*b*, each representing schools in the district 702*a* that may include a plurality of grades. For example, the school 704*a* is associated with a plurality of grades 706*a* and up to 706*b*, each representing grades (e.g., groups of students at the same education level in the school) in the school 704*a* that may include a plurality of classes. For example, the grade 706*a* is associated with a plurality of classes 708*a* and up to 708*b*, each representing classes in the grade 706*a* that may include a plurality of students. For example, the class 708*a* is associated with a plurality of students 710*a* and up to 710*b*, each representing students in the class 708*a*. Each of the identifiers for the districts, schools, grades, classes, and students may include additional information about those entities. For examples, identifiers for each class may include information about that class (e.g., a class subject, a class teacher, and/or other class information known in the art), and identifiers for the students may include information about that student (e.g., a student name, student performance, a student device identifier for a student device associated with that student (e.g., a Media Access Control (MAC) address, an IP address, or other computing device identifiers known in the art).

Figure 8:
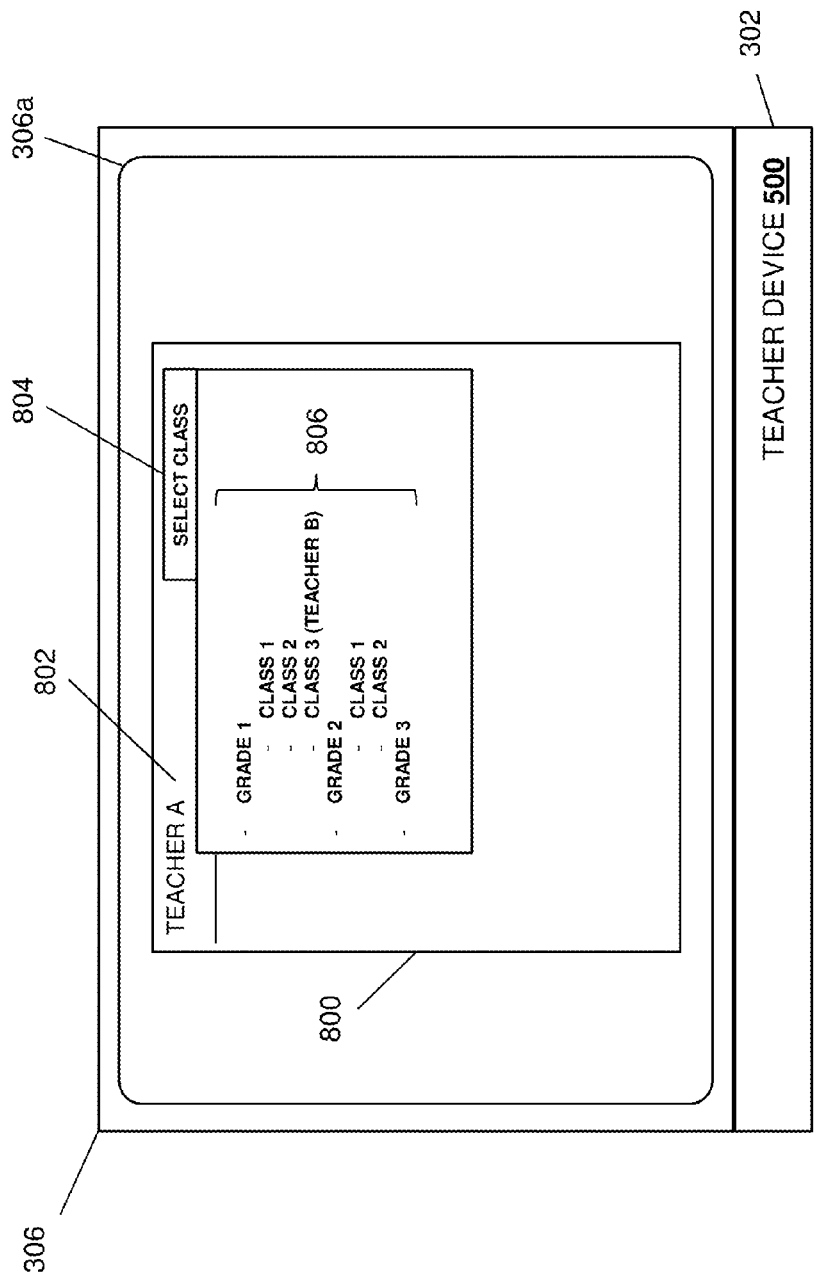
FIG. 8 is a screenshot illustrating an embodiment of a class selection screen on a teaching device in the student grouping and communication system of FIG. 2.

Referring now to FIG. 8, at block 602, the student device control/communication engine 503 in the teacher device 500 (illustrated in FIG. 8 as being provided by the computing device 300 of FIG. 3) may access the student data structure 700 and provide a graphical user interface 800 for display on the display system 306*a*/504. In the illustrated embodiment, the graphical user interface 800 includes a user indicator 802 that provides the identity of the user of the teacher device 500 (e.g., "TEACHER A", which may be retrieved and provided in response to the user of the teacher device 500 logging in or otherwise authenticating with the system), and includes a class selector 804 that may be selected to indicate a class of students. In response to a selection of the class selector 804, the student device control/communication engine 503 may retrieve and utilize the student data structure 700 to allow the user of the teacher device 500 to select a district, school, grade, and/or class in order to indicate a plurality of students whose student devices they would like to detect at block 602. For example, a teacher of class 708*a* may wish to select the class 708*a* in order to indicate they would like to detect the student devices for the students in the class 708*a*, and may do so utilizing a hierarchy 806 provided in the graphical user interface 800 that indicates grades, along with classes in those grades that are selectable to provide a class designation that designates a class of students (similar hierarchies may be provided and used to select the districts and schools discussed above as well). In some embodiments, classes currently being interacted with by a teacher may be designated in the hierarchy (e.g., as with "(TEACHER B)" in "CLASS 3" of "GRADE 1" in the illustrated embodiment). In some embodiments, upon receiving such an indication of students 710*a* and up to 710*b* associated with student devices, the student device control/communication engine 503 may then communicate over the network 202 with the student devices 206 and detect the students devices associated with the students 710*a* and up to 710*b*. While a few examples of detecting student device at block 602 have been provided, one of skill in the art in possession of the present disclosure will recognize that a variety of techniques may be utilized to detect the student devices that will fall within the scope of the present disclosure.

Figure 9:
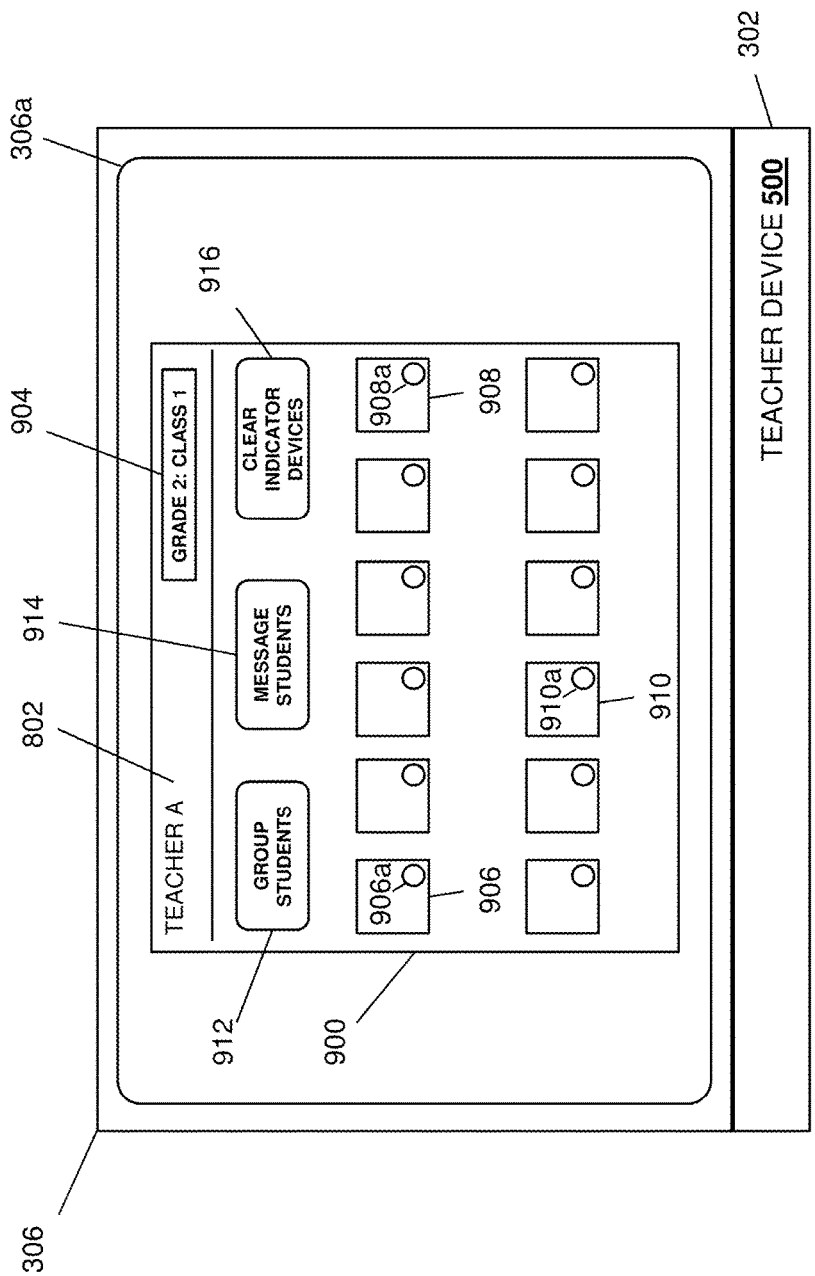
FIG. 9 is a screenshot illustrating an embodiment of a student display screen on a teaching device in the student grouping and communication system of FIG. 2.

The method 600 then proceeds to block 604 where the teacher device generates a graphical user interface that includes student device indicators. With reference to FIG. 9, in response to detecting the student device at block 602, the student device control/communication engine 503 may generate a graphical user interface 900 that illustrates the detected student devices along with elements that allow for grouping, communication, and/or other actions with those student devices. In the illustrated embodiment, the graphical user interface 900 includes a class indicator 904 that indicates the class selected at block 602 (which may be the class selector 804 discussed above with reference to FIG. 8 indicating the selected class). In addition, the graphical user interface 900 also includes a plurality of student device indicators 906, 908, and up to 910, each including a respective indicator device element 906a, 908a, and up to 910a that is configured to mimic the indicator device on its associated student device. In some embodiments, the number of student device indicators may be dictated by the number of student devices detected at block 602 (i.e., student devices not present in the classroom may not be provided associated student device indicators on the graphical user interface 900). In other embodiments, student device indicators may be provided for each of the student devices associated with students in the class (e.g., as selected using the class selector 804 and indicated by the class indicator 904), and not-present elements may be provided on student device indicators for student devices associated with students in a class that were not detected at block 602 (i.e., if the student device indicator 910 is provided for a student device in the class indicated by the class indicator 904, but that student device was not detected at block 602, a not-present indicator (e.g., an "X" over that student device indicator, a transparent student indicator, etc.) may be provided to indicate that that student device is not currently in the classroom. However, other graphical elements or techniques may be utilized with the student device indicators to indicate that a particular student device that is associated with a selected class is not present in that class or was otherwise not detected at block 602.

The graphical user interface 900 also includes a group-students element 912 that, as discussed below, may be selected to indicate that a user would like to group student devices associated with the student device indicators into different groups. The graphical user interface 900 also includes a message-students element 914 that, as discussed below, may be selected to indicate that a user would like to send a message to one or more student devices. The graphical user interface 900 also includes a clear-indicator-devices element 916 that, as discussed below, may be selected to send an instruction to stop indications being provided by indicator devices on the student devices. While a specific embodiment of the graphical user interface providing student device indicators has been illustrated and described including specific elements and features, other elements and features for controlling and/or communicating with the student devices may be provided while remaining within the scope of the present disclosure.

Figure 10:
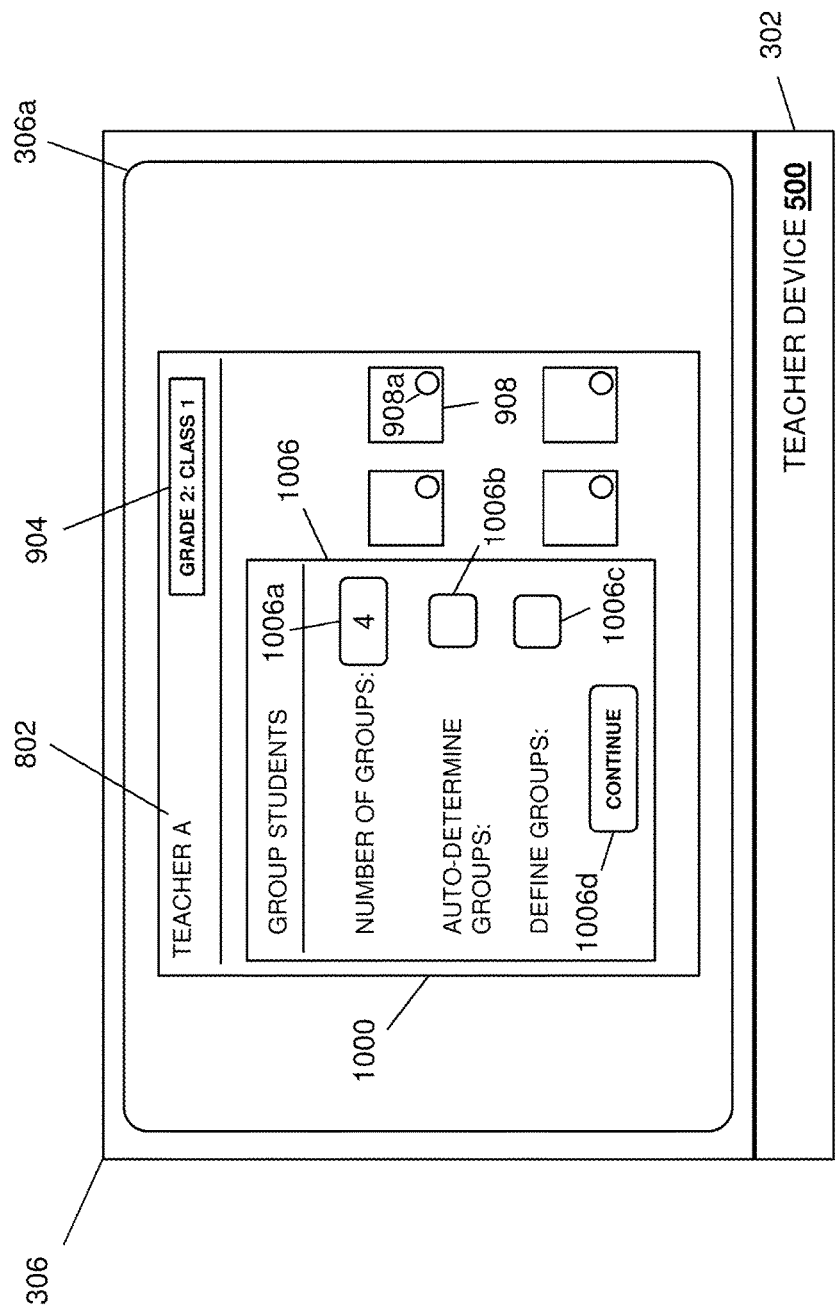
FIG. 10 is a screenshot illustrating an embodiment of a student grouping screen on a teaching device in the student grouping and communication system of FIG. 2.

The method 600 then proceeds to block 606 where the teacher device receives a request to group student devices. As discussed above, a user of the teacher device 500 may select the group-students element 912 on the graphical user interface 900 in order to provide a request to the student device control/communication engine 503 to group student devices. Referring now to FIG. 10, in response to receiving the request to group student devices, in some embodiments the student device control/communication engine 503 may generate a graphical user interface 1000 that is configured to allow a user to define how groups of student devices are determined. In the illustrated embodiment, the graphical user interface 1000 includes grouping element 1006 that, in the illustrated embodiment, includes a group number input 1006a that allows the user to indicate a number of groups of student devices they would like to create, an auto-determine groups input 1006b that allows the user to indicate they would like the student devices to be divided into groups randomly, a define groups input 1006c that allows the user to indicate they would like the define at least some of the student devices included in each group, and a continue element 1006d that allows the user to indicate they are done providing information about the grouping of student devices. While a specific graphical user interface 1000 has been described that allows a user to define how groups of student devices are determined, other elements may be provided to define any other characteristics of the groups while remaining within the scope of the present disclosure. For example, elements may be provided that allow the grouping according to student characteristics (e.g., grouping students by current performance in the class, by age, etc.) while allowing mixes of those characteristics (e.g., a distribution of students having different current performance levels, different ages, etc.) in order to result in groups that exhibit any characteristics desired by the user. As such, groups of students may be created that are defined by students of the same performance level, students have different performance levels, students of the same age, students have different ages, students having behavior issues, students having no behavior issues, etc.

The method 600 then proceeds to block 608 where the teacher device determines groups of student devices. As discussed below, groups of student devices may be determined by a user selecting student devices for each group using the teacher device 500, the teacher device 500 automatically determining groups randomly or according to some criteria stored in or provided to the teacher device 500, and/or via any other grouping technique known in the art. As such, while a specific example of a user selecting student devices for each group using the teacher device 500 is illustrated and described below, one of skill in the art in possession of the present disclosure will recognize that the groups illustrated and discussed below may result from automatic determinations by the teacher device 500 and/or using other techniques while remaining within the scope of the present disclosure.

Figure 11A:
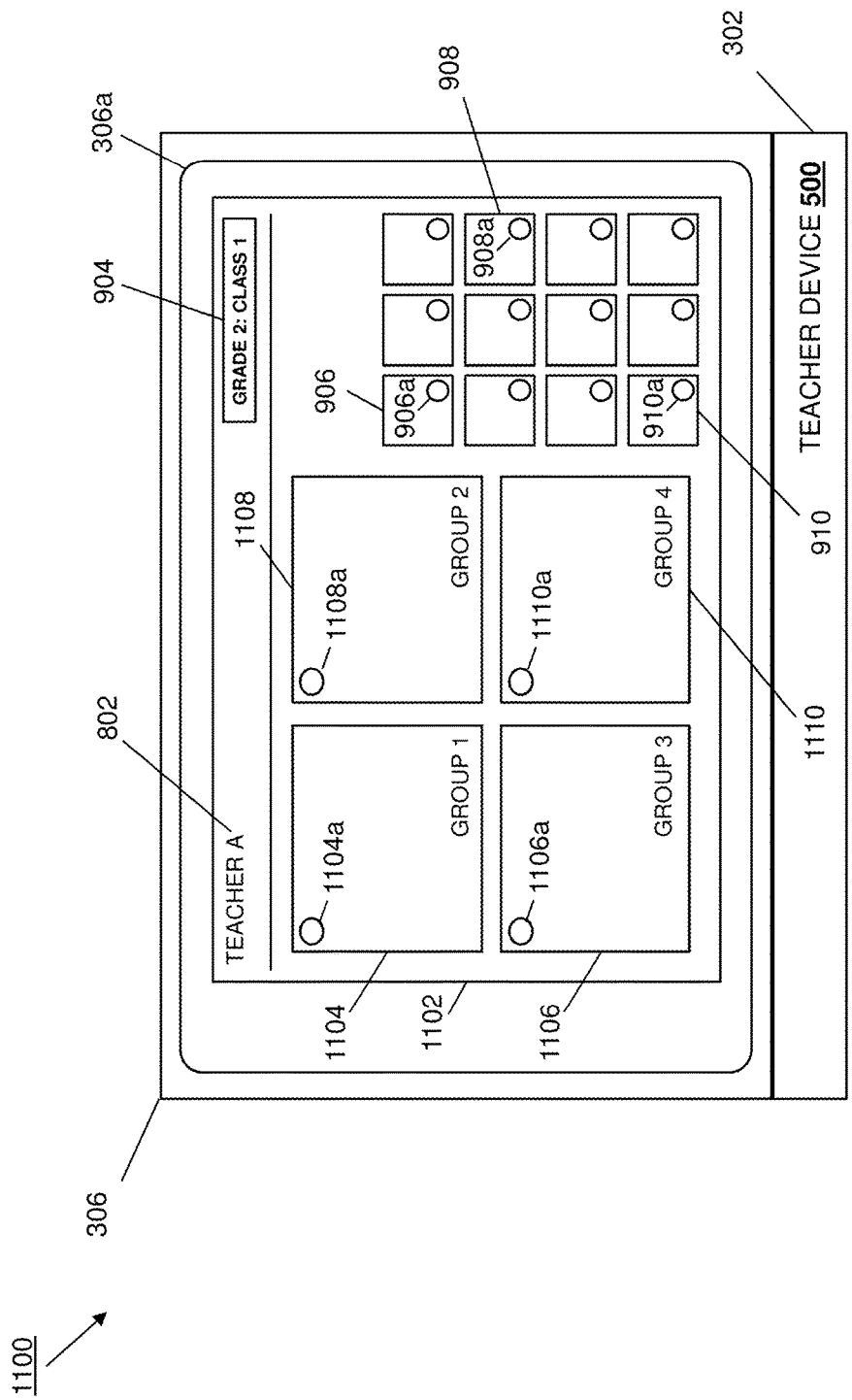
FIG. 11A is a screenshot illustrating an embodiment of a student grouping screen on a teaching device in the student grouping and communication system of FIG. 2 during the method of FIG. 6.

Referring now to FIG. 11A, an embodiment of a manual group designation 1100 is illustrated. In the illustrated embodiment, the student device control/communication engine 503 may have received a request to group student devices along with a designation of 4 groups on the group number input 1006a and an indication the use would like to define at least some of the student devices in each group on the define groups input 1006c, discussed above with reference to FIG. 10. In response, the student device control/communication engine 503 may generate a graphical user interface 1102 that provides a plurality of group designator elements 1104, 1106, 1108, and 1110 (e.g., one for each group to be created) that each include a respective group identification element 1104a, 1106a, 1108a, and 1110a. In addition, each of the student device indicator (e.g., 906, 908, and up to 910) may be relocated adjacent the group designator elements 1104-1110, as illustrated. In an embodiment, each of the group identification elements 1104a, 1106a, 1108a, and 1110a may provide a different indication (e.g., relative to each other) to indicate a particular group. For example, the group identification element 1104a may provide a first color group identification (e.g., red), the group identification element 1106a may provide a second color group identification (e.g., blue), the group identification element 1108a may provide a third color group identification (e.g., green), and the group identification element 1110a may provide a fourth color group identification (e.g., yellow). The graphical user interface 1202 may enable the user of the teacher device 500 to turn off the indications provided by the group identification elements 1104a, 1106a, 1108a, and 1110a, or change any indication (e.g., to change the color associated with the group) provided by the group identification elements 1104a, 1106a, 1108a, and 1110a. While a specific example with a particular number of groups and color group identifications is provided, one of skill in the art in possession of the present disclosure will recognize that other numbers of groups and additional or other types of group identifications (e.g., names, audio, etc.) may be utilized while remaining within the scope of the present disclosure.

Figure 11B:
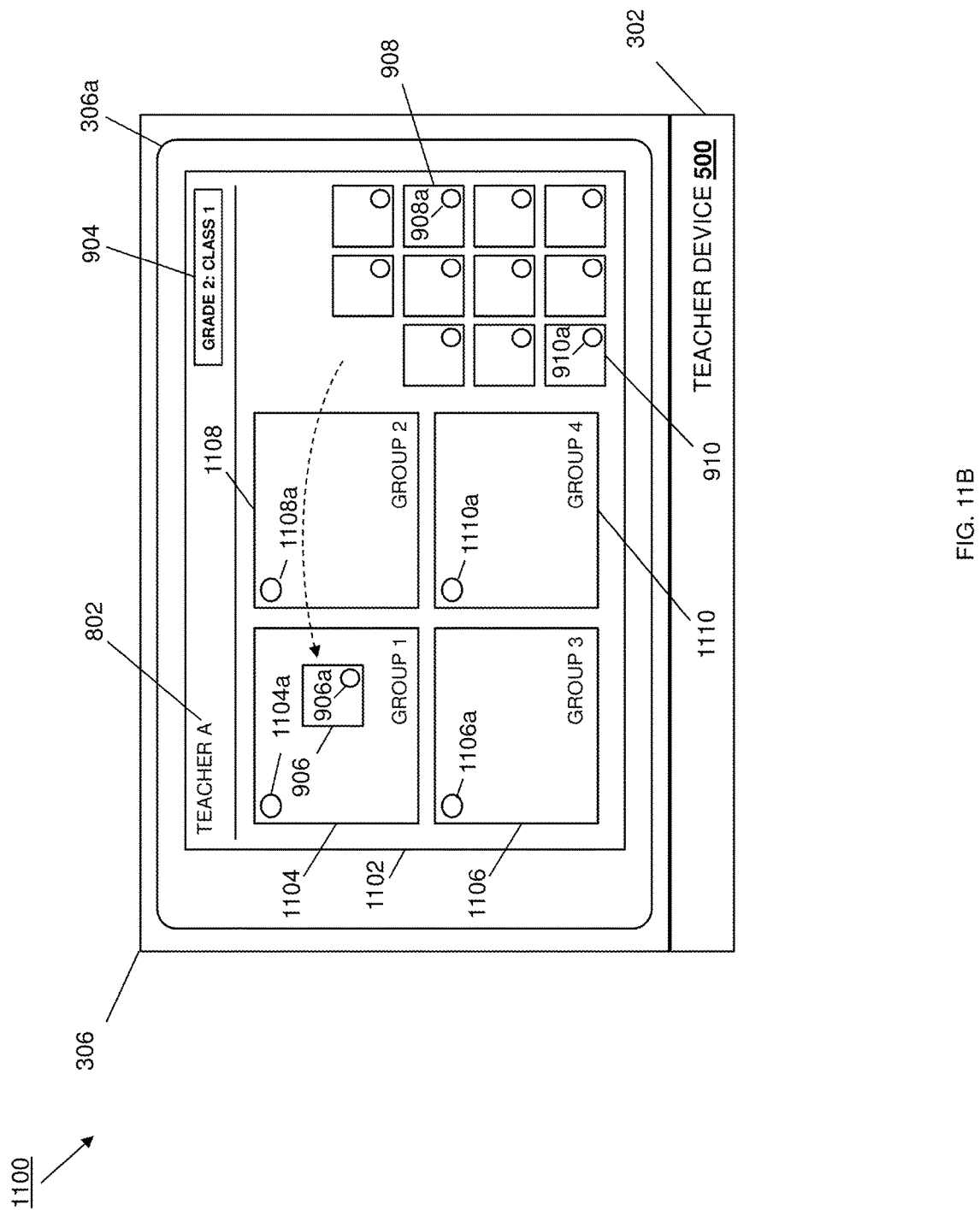
FIG. 11B is a screenshot illustrating an embodiment of a student grouping screen on a teaching device in the student grouping and communication system of FIG. 2 during the method of FIG. 6.

Referring now to FIG. 11B, the embodiment of manual group designation 1100 is continued where a user may associate student device indicators with group designator elements to designate the student device(s) associated with each group. For example, the graphical user interface 1102 may allow the user to select the student device indicator 906 and move that student device indicator 906 to the group designator element 1104 (as illustrated via a "drag-and-drop" action) in order to assign the student and student device associated with the student device indicator 906 to the group designated by the group designator element 1104. However, other methods for associating student devices and groups are envisioned as falling within the scope of the present disclosure. In some embodiments, the groups of student devices may be determined by the teacher device 500 at block 608 in response to the user of the teacher device 500 assigning each student device indicator to one of the group designator elements in a similar manner. In other embodiments, the user of the teacher device 500 may only assign some student device indicators to the group designator elements and have the other student device indicators automatically assigned to the group designator elements in order to, for example, manually assign group leaders while automatically assigning group members, or separate students with behavioral issues while allowing the teacher device 500 to divide up the remaining students with no behavioral issues. In yet other embodiments, rather than manual group designations, the user may have selected the auto-determine groups input 1006b discussed above with reference to FIG. 10 in order to have the teacher device 500 automatically associated each of the student device indicators with respective group designator elements.

Figure 12:
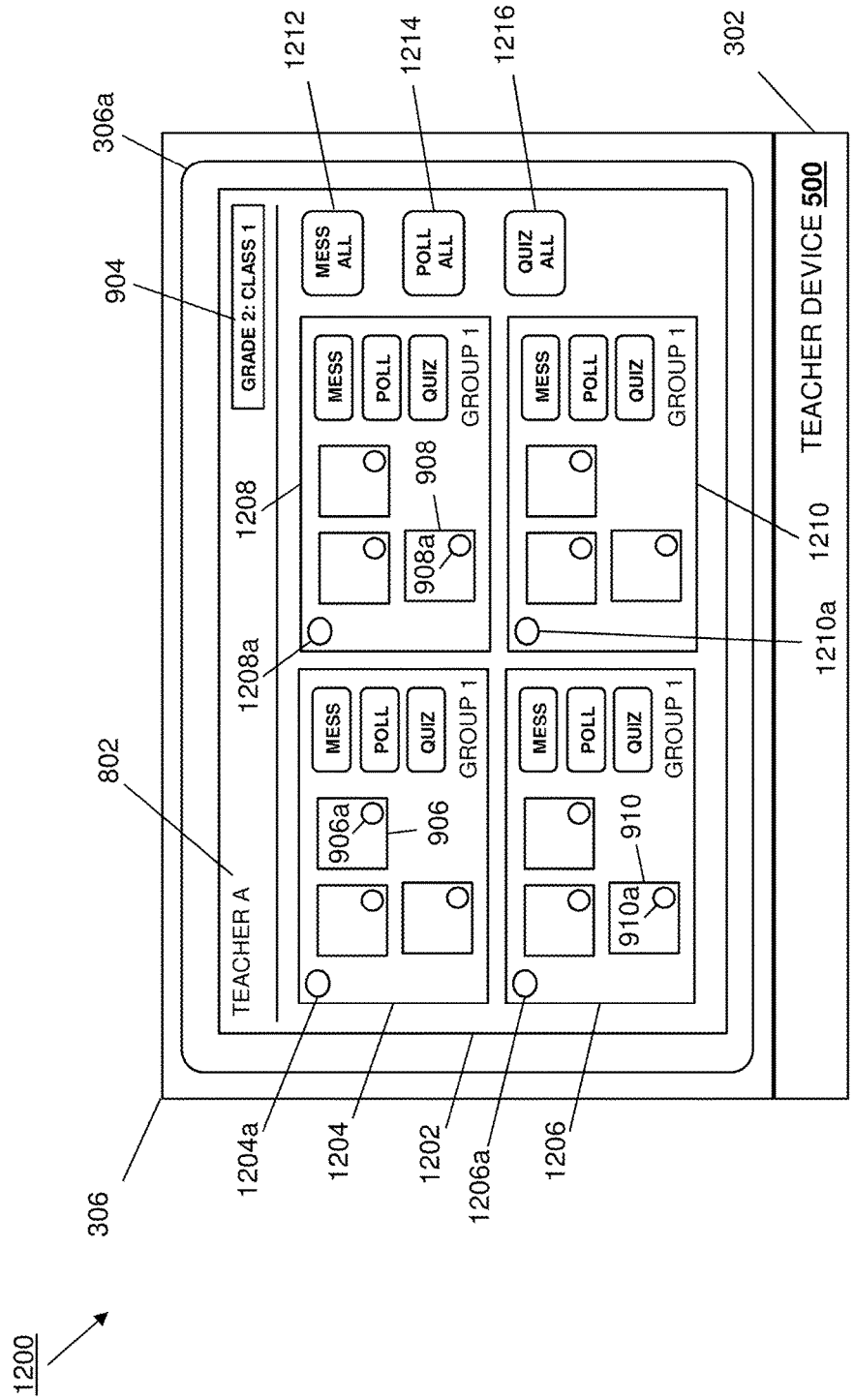
FIG. 12 is a screenshot illustrating an embodiment of a student grouping screen on a teaching device in the student grouping and communication system of FIG. 2.

Referring now to FIG. 12, an embodiment of a student grouping screen 1200 is illustrated that may be generated by the student device control/communication engine 503 following the determination of the groups of student devices at block 608. The student grouping screen 1200 includes a graphical user interface 1202 that provides a plurality of group identifiers 1204, 1206, 1208, and 1210 (e.g., one for each group that was created) that each include a respective group identification element 1204a, 1206a, 1208a, and 1210a that may operate substantially similarly to the group identification element 1104a, 1106a, 1108a, and 1110a discussed above. Each group identifier 1204-1210 identifiers a plurality of groups of student devices as represented by the student device indicators (e.g., 906, 908, and up to 910) within that group identifier. The graphical user interface 1202 also includes a message-all element 1212 that allows the teacher device 500 to send a message to all of the student devices associated with the student device indicators, a poll-all element 1214 that allows the teacher device 500 to send a poll to all of the student devices associated with the student device indicators, and a quiz-all element 1216 that allows the teacher device 500 to send a quiz to all of the student devices associated with the student device indicators, discussed in further detail below. While not provided with separate element numbers, each of the group identifiers 1204-1210 includes similar messaging, polling, and quizzing elements that allow the teacher device to send messages, polls, and quizzes to each of the different groups of students devices separately, as discussed in further detail below. Furthermore, the user of the teacher device 500 may switch between the view provided by the student grouping screen 1200 and the view provided by, for example, the graphical user interface 900 illustrated in FIG. 9 (which may still indicates groupings of student device via the indicator device elements 906a, 908a, and up to 910a). While a specific embodiment of a graphical user interface for displaying student device groupings has been illustrated, one of skill in the art in possession of the present disclosure will recognize that the illustrated graphical user interface may be modified and/or may include a variety of other group information, student device information, and/or communication capabilities while remaining within the scope of the present disclosure.

Figure 13:
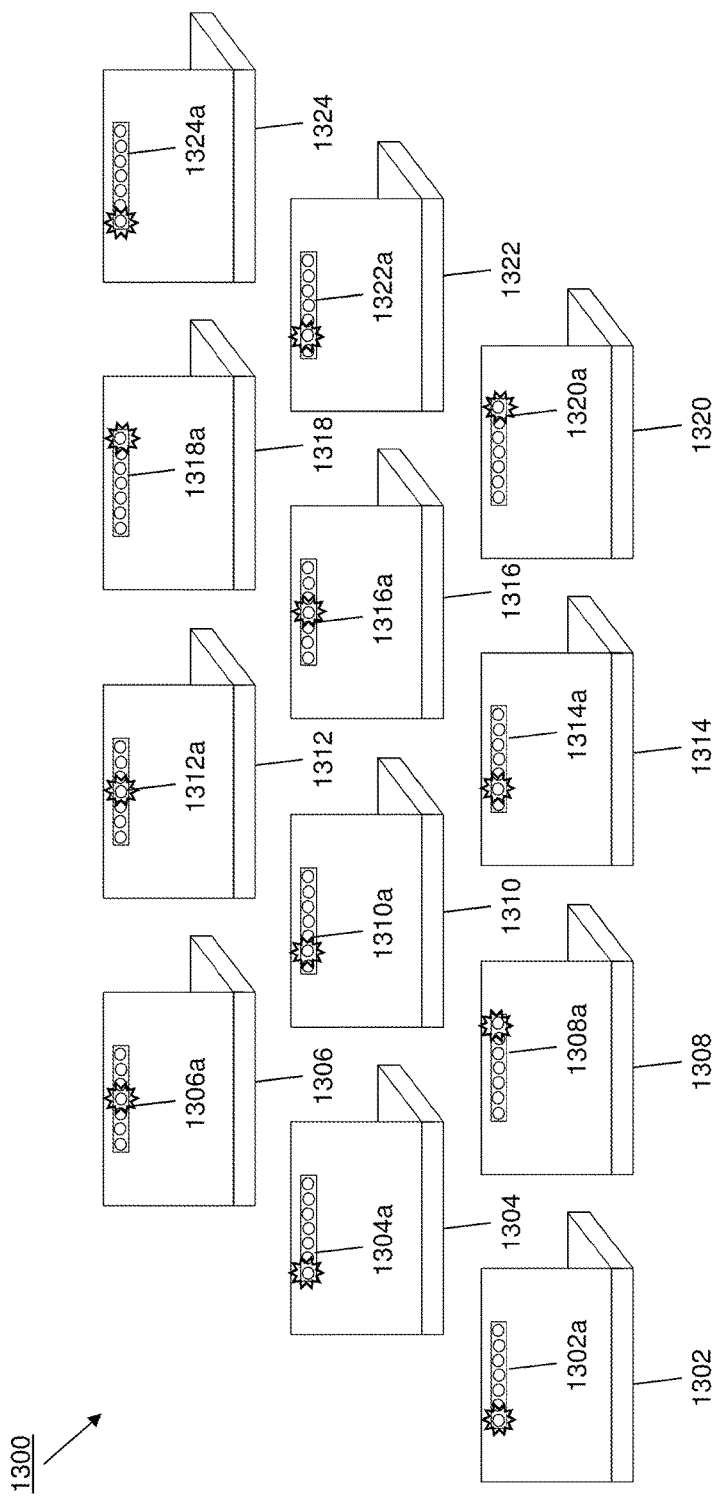
FIG. 13 is a perspective view illustrating an embodiment of a plurality of student devices in the student grouping and communication system of FIG. 2 providing group designation indications.

The method 600 then proceeds to block 610 where the teacher device sends student device group designation instructions to the student devices, and then to block 612 where the student devices activate indicators devices to provide group indicators. In an embodiment, the student device control/communication engine 503 in the teacher device 500 may communicate through the communication system 506 to provide group designation instructions through the network 202 that are received by the teacher device communication engine 403 in each of the student devices 300 (e.g., via their respective communication systems 406), and the teacher device communication engine 403 may then activate the indicator device 308/408 according to the group designation instructions. For example, FIG. 13 illustrates a classroom 1300 with a plurality student devices 1302, 1304, 1306, 1308, 1310, 1312, 1314, 1316, 1318, 1320, 1322, and 1324, each including a respective indicator device 1302a, 1304a, 1306a, 1308a, 1310a, 1312a, 1314a, 1316a, 1318a, 1320a, 1322a, and 1324a. Each of the student devices 1302-1324 may be student devices associated with the student device indicators discussed above, and thus may have been grouped substantially as discussed above. Upon receiving the group designation instructions from the teacher device 500, the student devices 1302-1324 may activate their indicator devices 1302a-1324a, respectively, to indicate which group they belong to. For example, in the illustrated embodiment, each of the student devices 1302, 1304, and 1324 is illustrated as activating the same LED indicator (e.g., a red LED) on their respective indicator devices 1302a, 1304a, and 1324a according to their received group designator instructions to indicate their group (e.g., the "RED" group). Similarly, each of the student devices 1310, 1314, and 1322 is illustrated as activating the same LED indicator (e.g., a blue LED) on their respective indicator devices 1310a, 1314a, and 1322a according to their received group designator instructions to indicate their group (e.g., the "BLUE" group), each of the student devices 1306, 1312, and 1316 is illustrated as activating the same LED indicator (e.g., a green LED) on their respective indicator devices 1306*a*, 1312*a*, and 1316*a* according to their received group designator instructions to indicate their group (e.g., the "GREEN" group), and each of the student devices 1308, 1318, and 1320 is illustrated as activating the same LED indicator (e.g., a yellow LED) on their respective indicator devices 1308*a*, 1318*a*, and 1320*a* according to their received group designator instructions to indicate their group (e.g., the "YELLOW" group).

With each of the student device activating their respective indicator devices according to the group designation instructions, the users (i.e., students) of those student devices may quickly recognize which group they have been assigned to, and may physically join that group by moving their student devices to a common location in the classroom 1300. Furthermore, the group indications provided by the indicators devices (e.g., the red, blue, green, and yellow LEDs discussed above) may allow the user (e.g., a teacher) of the teacher device 500 to quickly determine which student devices belong to which groups. In addition to the physical indications provided by the indicator devices 1302*a*-1324*a* on the student devices 1302-1324, the graphical user interface 1202 on the student grouping screen 1200 may provide similar group identifiers using the group identification element 1204*a*, 1206*a*, 1208*a*, and 1210*a* and/or the indicator device element 906*a*, 908*a*, and 910*a*. As such, activity of the indicator devices 1302*a*-1324*a* may be mimicked or otherwise duplicated on the graphical user interface 1202 on the student grouping screen 1200. Further still, when an indicator device is provided on the teacher device 500, that indications of that indicator device may be used to capture the attention of particular groups (e.g., a red LED indication provided by an indicator device on the teacher device may be used to indicate that the teacher would like the attention of students having student devices belonging to the RED group).

Figure 14:
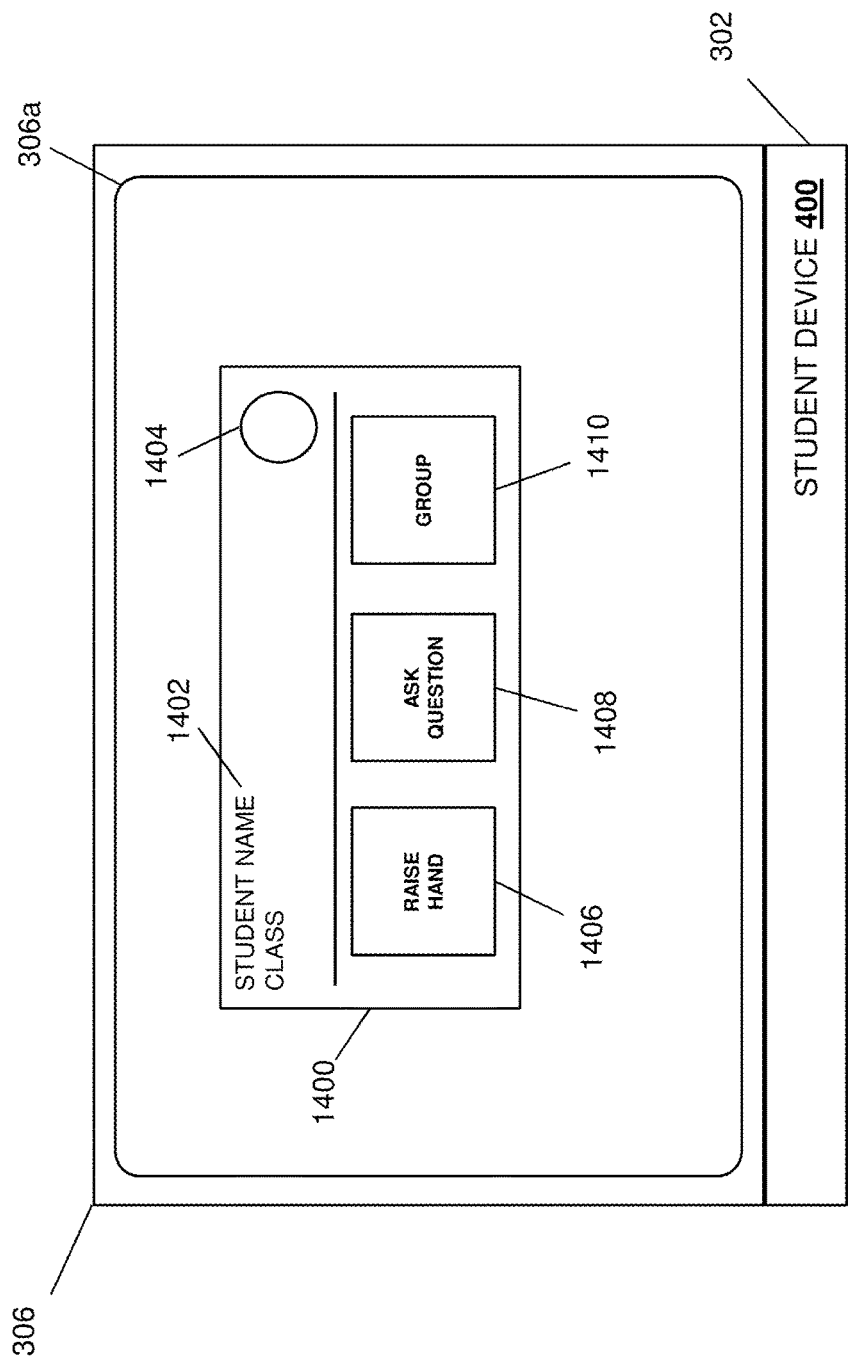
FIG. 14 is a screenshot illustrating an embodiment of a student grouping and communication options screen on a student device in the student grouping and communication system of FIG. 2.

The method 600 then proceeds to block 614 where the student devices communicate with the teacher device and other student devices. In different embodiments, in addition to the grouping indications and functionality discussed above, a wide variety of individual, group, and multi-group communication between the teacher device and/or the student devices may be enabled by the student grouping and communication system 200, just some of which is illustrated and described below. For example, with reference to FIG. 14, the teacher device communication engine 403 in each student device 400 (illustrated in FIG. 14 as being provided by the computing device 300 of FIG. 3) may provide a graphical user interface 1400 for display on the display system 306*a*/404. In the illustrated embodiment, the graphical user interface 1400 includes a student/class indicator 1402 that may display the name of the student associated with the student device 400 and the class they're currently in (e.g., as determined via the communications with the teacher device 500 as discussed above). The graphical user interface 1400 may also include an indicator device element 1404 that is configured to display any indication that is being displayed by the indicator device 408 on the student device 400. For example, if the indicator device 408 on the student device 400 is activating a red LED to indicate which group the student device 400 has been associated with, and indicator device element 1404 may provide a red color and indicate to the user of the student device 400 that the red color is providing a group indication (while a non-activated LED may indicate the student device 400 has not been associated with a group). When multiple LEDs are activated on the indicator device 408, the indicator device element 1404 may provide those multiple indications or circulate through those multiple indications. In some embodiments, the user of the student device 500 may select the indicator device element 1404 to turn off any indication being provided by the indicator device 408. The graphical user interface 1400 also includes a raise-hand element 1406 that the user may select to "raise their hand" or otherwise indicate that they have a question for the teacher (which may be indicated to the teacher using the indicator device 408 via, for example, a blinking green LED indicator), an ask-question element 1408 that the user may select to ask a question to the teacher or other students, and a group element 1410 that the user may select to access group functionality such as communicating with members of their group, members of other groups, etc.

Figure 15:
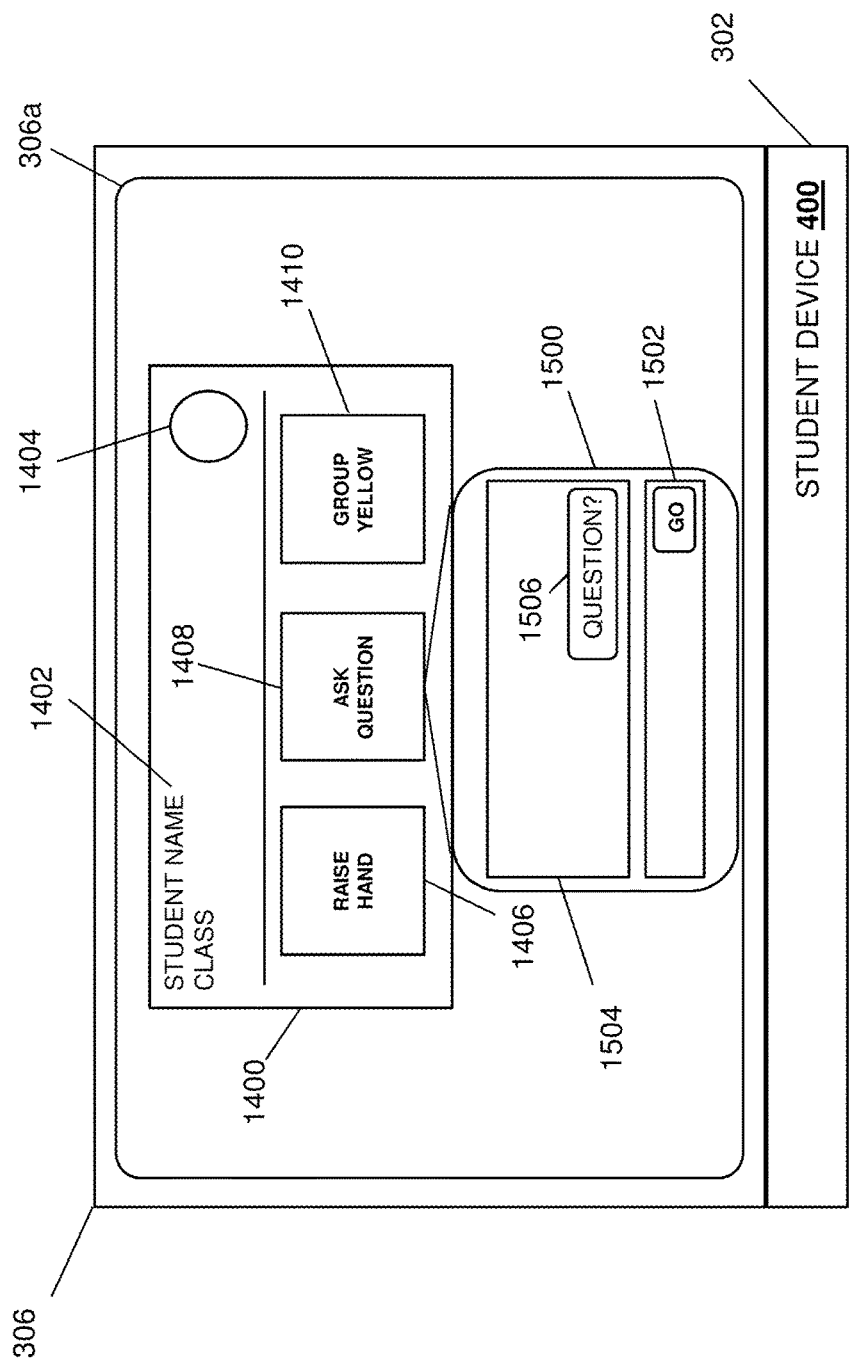
FIG. 15 is a screenshot illustrating an embodiment of a student communication screen on a student device in the student grouping and communication system of FIG. 2.

Referring now to FIG. 15, an embodiment of a communication with the student device 400 is illustrated that includes a communication element 1500 that may be provided by the teacher device communication engine 403 in response to a user selecting the ask-question element 1408 on the graphical user interface 1400. In different embodiments, the selection of the ask-question element 1408 may allow the user to define whom the communication should be directed to (e.g., a teacher via their teacher device, a student via their student device, a group of students via their student devices, etc.) In the illustrated embodiment, the communication element 1500 includes a communication input 1502 that the user may utilize to provide communications, along with a communication history 1504 that displays the communications that have been previously provided (e.g., the question 1506 in the illustrated embodiment that the user may have previously provided in the communication input 1502). In some embodiments, the teaching device 500 may be configured to provide a notification to a user of the teacher device 500 when a student device 400 has sent such a communication by, for example, providing a notification on the student device indicator associated with the student device 400 using the graphical user interface 900 discussed above with reference to FIG. 9.

Figure 16:
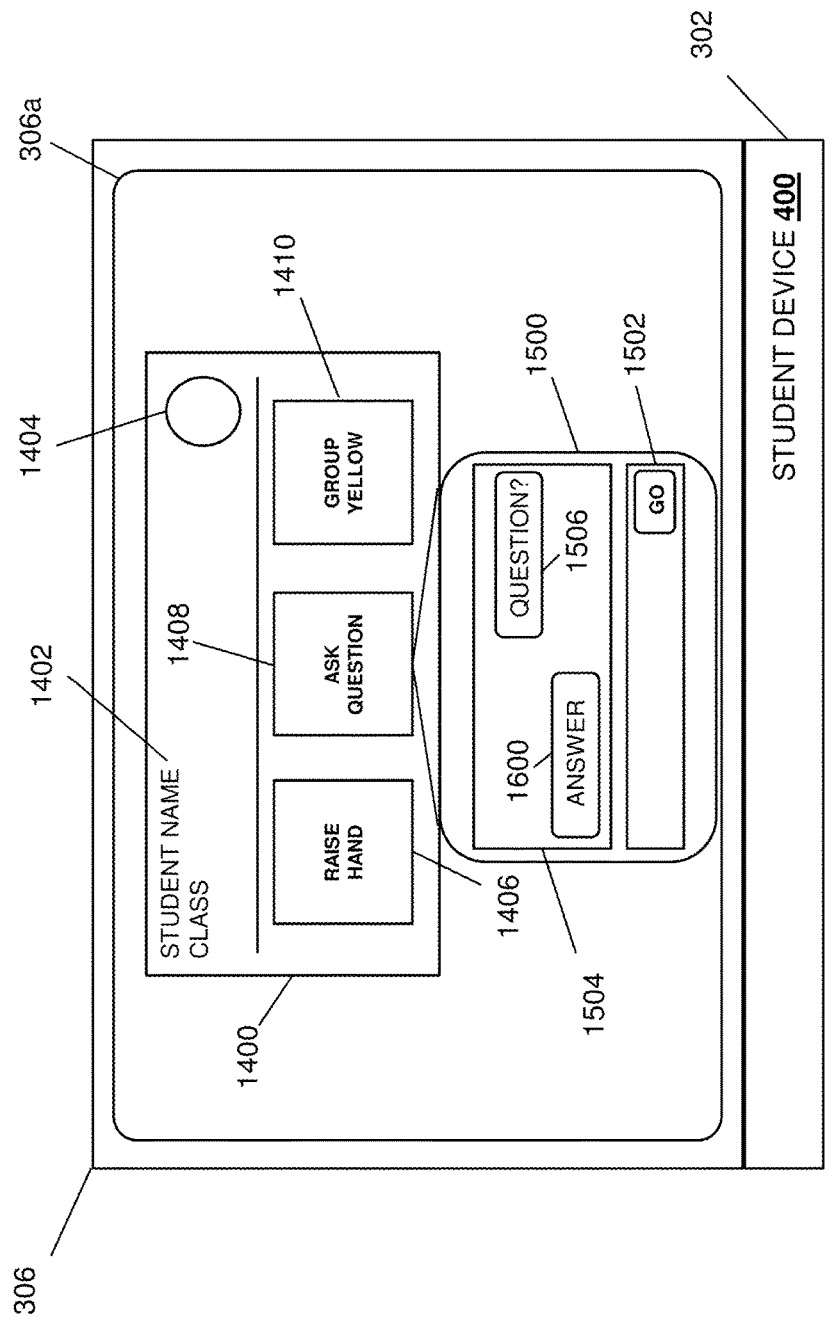
FIG. 16 is a screenshot illustrating an embodiment of a student communication screen on a student device in the student grouping and communication system of FIG. 2.

FIG. 16 illustrates how the student device 400 may receive a response 1600 from a teacher via their teacher device 500, a student via their student device 400, or a group of students via their student devices 400 through the communication element 1500. In some embodiments, the receiving of a communication at a student device 400 may result in the graphical user interface 1400 for that student device 400 indicating the communication is being provided (e.g., by providing a communication received notification on the ask-question element, activating the indicator device element 1404 (e.g., a blinking red LED indication), and/or in any other manner of indication known in the art). Thus, with each of the student devices 400 (and the teacher device 500) providing a graphical user interface similar to the graphical user interface 1504 in response to a request to communication (e.g., via the ask question element 1408), the teacher device and/or the student device(s) may perform directed, group, and multi-group or all-group communications.

Figure 17:
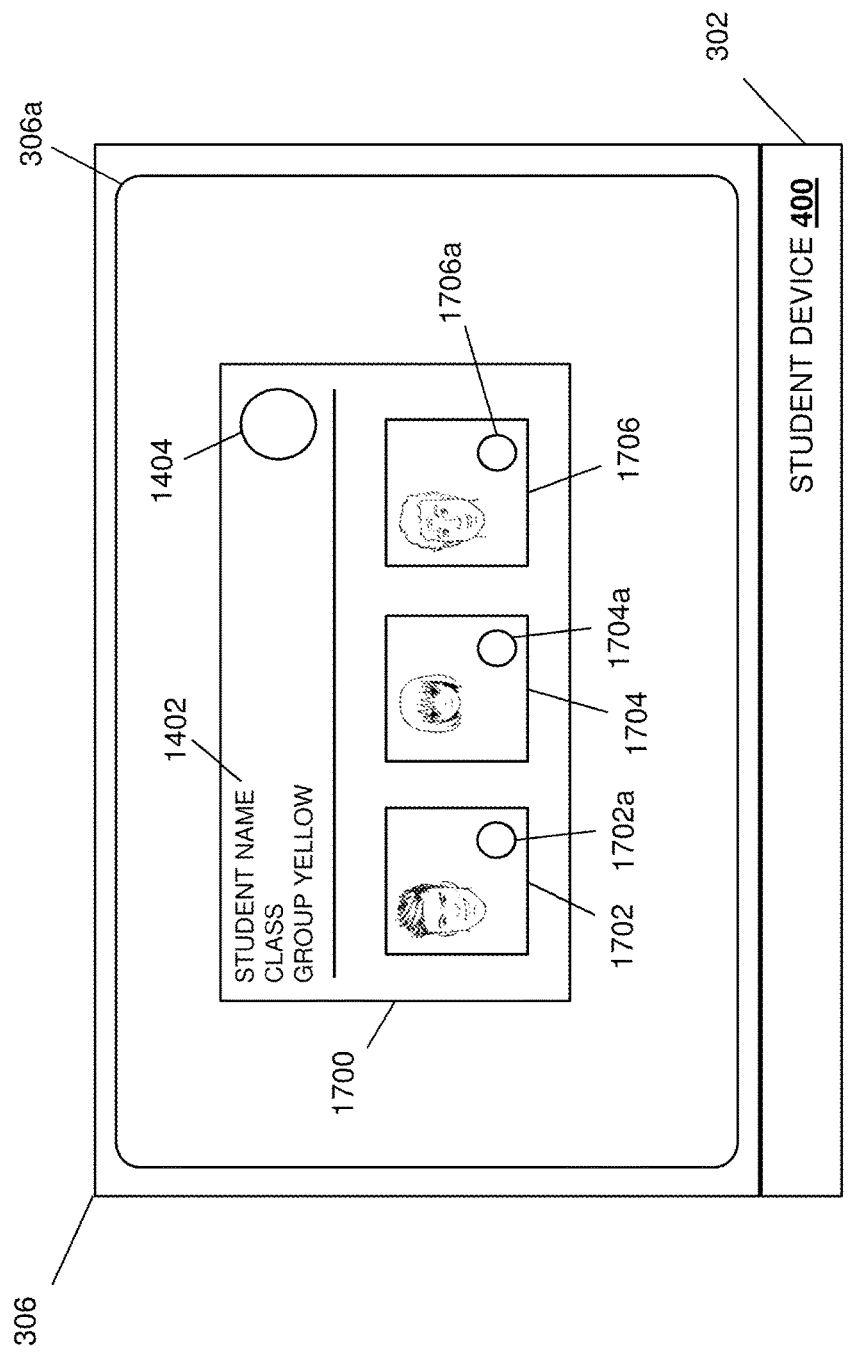
FIG. 17 is a screenshot illustrating an embodiment of a student group screen on a student device in the student grouping and communication system of FIG. 2.

Referring now to FIG. 17, an embodiment of group functionality on the student device 400 is illustrated that includes a group identification and communication element 1700 that may be provided by the teacher device communication engine 403 in response to a user selecting the group element 1410 on the graphical user interface 1400, and that may add a group designation (e.g., "YELLOW" group) to the student/class indicator 1402. In addition, the graphical user interface 1700 also includes a plurality of group member indicators 1702, 1704, and 1706 for each student and associated student device that is in the same group as the student device 400. In the illustrated embodiment, each group member indicator 1702, 1704, and 1706 includes an image of the student associated with that group member indicator, as well as a respective indicator device element 1702a, 1704a, and 1706a that displays the indication currently being provided by the indicator device on the student device associated with that group member indicator. Similarly as discussed above, the user of the student device 400 may select any of the group member indicators 1702-1706 in order to communicate with the associated group member via their student device, retrieve information about the associated student, and/or provide a variety of other functionality that would be apparent to one of skill in the art in possession of the present disclosure. In addition, graphical user interfaces may be provided for other groups (e.g., groups to which the user of the student device 400 does not belong) that have similar functionality while remaining within the scope of the present disclosure.

Figure 18:
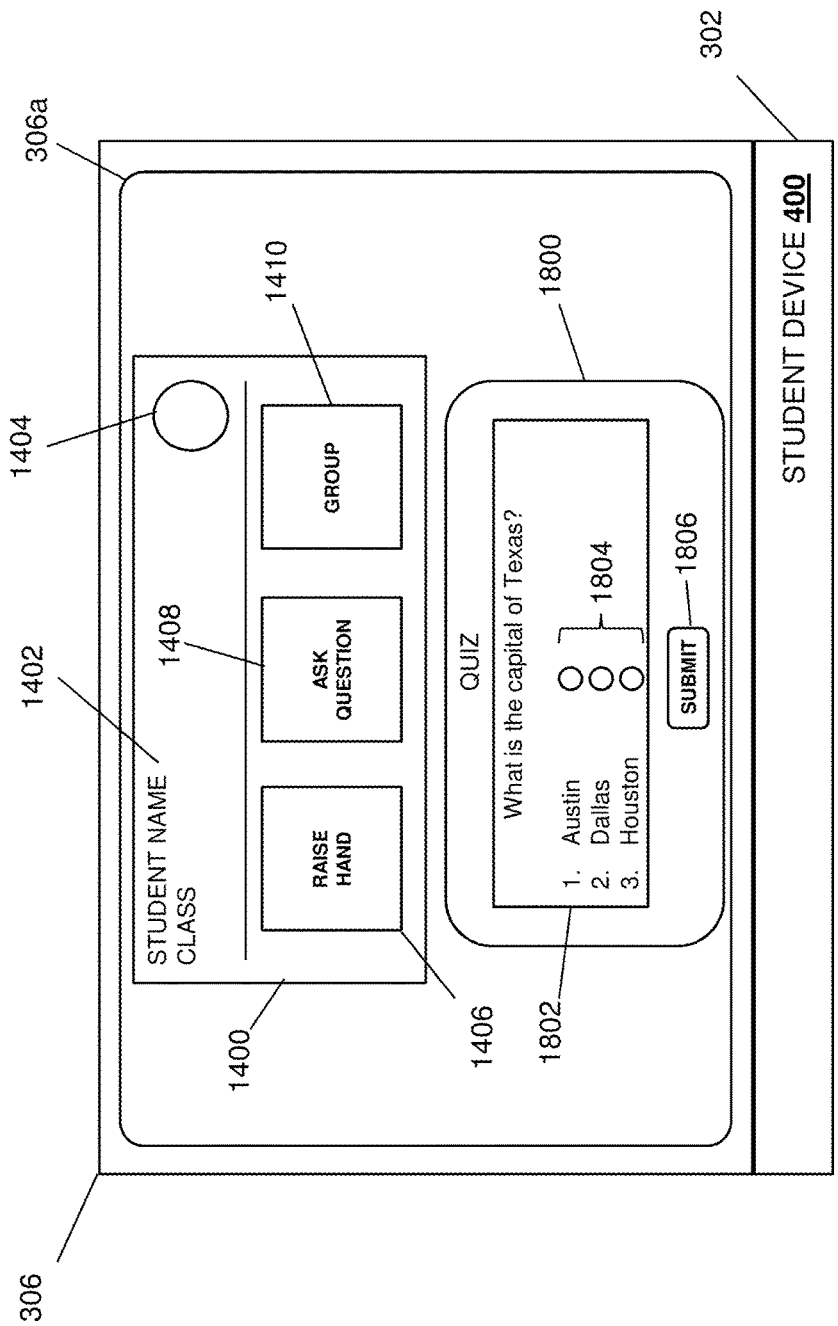
FIG. 18 is a screenshot illustrating an embodiment of a student communication screen on a student device in the student grouping and communication system of FIG. 2.

Referring now to FIG. 18, an embodiment of teacher communication on the student device 400 is illustrated that includes a quiz element 1700 that may be provided by the teacher device communication engine 403 in response to a user of the teaching device 500 sending a quiz to the student device 400. The quiz element 1700 includes a question box 1802 that includes at least one quiz question along with a plurality of answer selectors 1804 that the user of the student device 400 may select to answer the quiz, as well as a submit element 1806 that the user may select to submit their answer. As discussed above, such quizzes may be directed by the teacher device 500 to one or more of the student devices 400 directly, to selected groups of students devices, or to all of the student devices. For example, a user of the teacher device 500 may select a group identifier (e.g., the group identifier 1204) and provide a communication (e.g., via the quiz element in group identifier) to provide a group communication to each of the student devices in the group identified by the group identifier. Furthermore, polls (e.g., questions provided with no correct/incorrect answers), messages, and/or other communications may be sent by the teacher device 500 to the student device 400 in a similar manner. As such, the teacher device 500 may provide graphical user interfaces for creating quizzes and polls and sending them out to the student device(s). Answers provided to quizzes or polls may be displayed on the teacher device 500, and results of those quizzes or polls may be tabulated for quick viewing. For example, the graphical user interface 900 of FIG. 9 may be provided to display the student device indicators that indicate which of the students answered a question correctly (e.g., via a green indication) or incorrectly (e.g., via a red indication), and the indicator devices 408 on the student devices 400 may provide similar indications as well to allow a teachers to quickly determine which of the students answered the quiz question correctly or incorrectly. Charts, graphs, and/or other information displays may be provided on the teacher device 500 to allow the user of the teacher device to view results of a poll or quiz by student, group, or multiple groups as well.

One of skill in the art will recognize that other functionality may be realized using the systems and methods of the present disclosure that may have not been described in detail above. For example, the clear indicator devices element 916 discussed above with reference to FIG. 9 may be used to clear indications being provided by the indicator devices 408 on any or all of the student devices 400 (e.g., such that all LEDs on those indicator devices are deactivated), as well as any indicator elements displayed on any graphical user interfaces provided on the teacher device 500. Furthermore, similar to the quizzes and polls, the teacher device 500 may provide graphical user interfaces that allow the user of the teacher device 500 to send links to web sites or web pages to any or all of the student device(s) 400. Thus, systems and methods have been described that provide for the communication between teacher device(s) and student devices in order to detect those student devices, display those student devices on the teacher device, and allow the teacher device to group the student device and communicate with the student devices in a wide variety of manners. Such systems and methods provide for quick and easy groupings of students, as well as efficient and targeted communications with those groups of students to provide an improved teacher/student interaction that can increase the productivity in the classroom.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method for grouping student devices, comprising:
receiving, by a processing system on a student device through a network, a first group designation instruction for a first group of student devices of a plurality of student devices;
activating, based on the first group designation instruction and by the processing system on the student device, a visual indicator device that is located on a first side of a display system provided by the student device and coupled to the processing system to provide a first type group designation visual indication assigned to the first group of student devices that is different than a second type group designation visual indication provided by visual indicator devices on student devices in a second group of student devices; and
displaying, by the processing system on the student device, a student graphical user interface on a display screen that is located on a second side of the display system, wherein the student graphical user interface includes a visual indicator device element that is configured to display the first type group designation visual indication being displayed on the visual indicator device, wherein the visual indicator device faces a first direction and the display screen faces a second direction that is opposite the first direction.

2. The method of claim 1, further comprising:
providing, for display on a display system of a teacher device by a processing system on the teacher device, a teacher graphical user interface that includes a student device indicator for each of the plurality of student devices that are coupled to the teacher device through the network;
receiving, via an input system by the processing system on the teacher device, a request through the teacher graphical user interface to group the plurality of student devices; and
determining, by the processing system on the teacher device, the first group of student devices and the second group of student devices, wherein each of the first group of student devices and the second group of student devices includes a subset of the plurality of student devices that are not included in the other group of student devices; and generating, by the processing system on the teacher device, the first group designation instruction that includes the first type group designation visual indication assigned to the first group of student devices and a second group designation instruction that includes the second type group designation visual indication assigned to the second group of student devices.

3. The method of claim 2, further comprising:
providing, for display on the display system of the teacher device by the processing system of the teacher device, a first group identifier and a second group identifier on the teacher graphical user interface, wherein the first group identifier identifies the first group of student devices and the second group identifier identifies the second group of student devices.

4. The method of claim 3, further comprising:
receiving, via the input system on the teacher device by the processing system of the teacher device, a selection of the first group identifier along with a group communication; and
providing, by the teacher device through the network to each student device in the first group of student devices identified by the first group identifier, the group communication.

5. The method of claim 2, further comprising:
randomizing, by the processing system on the teacher device, each subset of the plurality of student devices included in the first group of student devices and the second group of student devices.

6. The method of claim 2, further comprising:
receiving, via the input system on the teacher device by the processing system of the teacher device, a class designation that is associated with the plurality of student devices and, in response, retrieving a student device identifier of each of the plurality of student devices.

7. The method of claim 2, further comprising:
providing, for display on the display system by the processing system of the teacher device, a plurality of group designator elements on the teacher graphical user interface; and
determining, by the teacher device, the first group of student devices and the second group of student devices in response to receiving an association of each of the student device indicators with a respective one of the plurality of group designator elements.

8. The method of claim 1, wherein the visual indicator device is configured to display a plurality of colors, and wherein the first group designation instruction are configured to cause the visual indicator device to display a first type group designation visual indication color that is different than a second type group designation visual indication color displayed by indicator devices on student devices in the second group of student devices.

9. The method of claim 1, further comprising:
displaying, by the processing system on the student device, a communication element on the display screen;
facilitating, by the processing system on the student device via the communication element and based on the first group designation instruction, communication through the network between the student device and student devices of the plurality of student devices belonging to the first group of student devices; and
preventing, by the processing system on the student device via the communication element and based on the first group designation instruction, communication through the network between the student device and student devices of the plurality of student devices that do not belong to the first group of student devices.

10. A student device grouping and communication system, comprising:
a network;
a plurality of student devices that are each coupled to the network, wherein each of the plurality of student devices includes a display system that comprises:
a display screen that is located on a first side of the display system and that faces a first direction; and
a visual indicator device that is located on a second side of the display screen and that faces a second direction that is opposite the first direction, wherein the visual indicator device is configured to provide a group designation visual indication; and
a teacher device that is coupled to the network and that is configured to:
provide a teacher graphical user interface for display that includes a student device indicator for each of the plurality of student devices;
receive a request through the teacher graphical user interface to group the plurality of student devices;
determine a plurality of groups of student devices, wherein each of the plurality of groups of student devices includes a subset of the plurality of student devices that are not included in the others of the plurality of groups of student devices; and
provide a group designation instruction through the network to each of the plurality of student devices, wherein the group designation instruction is configured to:
cause each student device within each respective group of student devices to activate the visual indicator device on those student devices to provide a first type group designation visual indication that is different than a plurality of other types of group designation visual indication provided by the visual indicator device on student devices in the others of the plurality of groups of student devices;
cause each student device within each respective group of student devices to provide a student graphical user interface on the display screen, wherein the student graphical user interface includes a visual indicator device element that is configured to display the first type group designation visual indication being displayed on the visual indicator device; and
cause each student device within each respective group of student devices to display a communication element on the display screen that is configured to:
facilitate network communication between student devices that belong to the same respective group of student devices; and
prevent network communication between student devices that do not belong to the same respective group of student devices.

11. The student device grouping and communication system of claim 10, wherein the teacher device is configured to:
provide a plurality of group identifiers on the teacher graphical user interface, wherein each group identifier identifies a respective one of the plurality of groups of student devices.

12. The student device grouping and communication system of claim 11, wherein the teacher device is configured to:
receive a selection of a first group identifier of the plurality of group identifiers along with a group communication; and
provide the group communication through the network to each student device in the group of student devices identified by the first group identifier.

13. The student device grouping and communication system of claim 10, wherein the teacher device is configured to:
provide a plurality of group designator elements on the teacher graphical user interface; and
determine the plurality of groups of student devices in response to receiving an association of each of the student device indicators with a respective one of the plurality of group designator elements.

14. The student device grouping and communication system of claim 10, wherein the teacher device is configured to:
randomize each subset of the plurality of student devices included in each group of student devices.

15. The student device grouping and communication system of claim 10, wherein the visual indicator device on each of the plurality of student devices is configured to display a plurality of colors, and wherein the visual indicator device on each respective group of student devices displays a first type group designation visual indication color that is different than other group designation visual indication colors that are displayed by the visual indicator device on student devices in the others of the plurality of groups of student devices.

16. An information handling system (IHS), comprising:
a display system that includes:
a display screen that is located on a first side of the display system and that faces a first direction; and
a visual indicator device that located on a second side of the display screen and that faces a second direction that is opposite the first direction, wherein the visual indicator device is configured to provide a group designation visual indication;
a communication system that is configured to couple to a plurality of student devices and a teacher device through a network;
a processing system that is coupled to the communication system and the display system; and
a memory system that is coupled to the processing system and that includes instructions that, when executed by the processing system, cause the processing system to provide a teacher device communication engine that is configured to:
receive a first group designation instruction for a first group of student devices via the communication system through the network;
activate, based on the first group designation instruction, the visual indicator device to provide a first type group designation visual indication assigned to the first group of student devices that is different than a second type group designation visual indication provided by visual indicator devices on student devices in a second group of student devices;
display a student graphical user interface on the display screen, wherein the student graphical user interface includes a visual indicator device element that is configured to display the first type group designation visual indication being displayed on the visual indicator device;
display, on the display screen, a communication element;
facilitate, based on the first group designation instruction and via the communication element, communication through the network between the communication system and the student devices belonging to the first group of student devices; and
prevent, based on the first group designation instruction and via the communication element, communication through the network between the communication system and student devices that do not belong to the first group of student devices.

17. The IHS of claim 16, wherein the first group designation instruction was generated by the teacher device in response to the teacher device:
providing a teacher graphical user interface for display on a display system of the teacher device that includes a student device indicator for each of the plurality of student devices;
receiving a request through the teacher graphical user interface to group the plurality of student devices;
determining the first group of student devices and the second group of student devices, wherein each of the first group of student devices and the second group of student devices includes a subset of the plurality of student devices that are not included in the other group of student devices; and
assigning a first type group designation visual indication to the first group of student devices and a second type group designation visual indication to the second group of student devices.

18. The IHS of claim 17, wherein each subset of the plurality of student devices included in each group of student devices is randomized.

19. The IHS of claim 16, wherein the visual indicator device is configured to display a plurality of colors, and wherein the first group designation instruction are configured to cause the visual indicator device to display a first type group designation visual indication color that is different than a second type group designation visual indication color displayed by indicator devices on student devices in the second group of student devices.

20. The IHS of claim 16, wherein the teacher device communication engine is configured to:
detect, by the communication system and over a short range network that is different than the network, the teacher device and, in response,
provide, via the communication system and over the network, a student device identifier.

* * * * *